US012523076B2

(12) United States Patent
Schmitz

(10) Patent No.: US 12,523,076 B2
(45) Date of Patent: Jan. 13, 2026

(54) HINGE LOCK

(71) Applicant: EMKA BESCHLAGTEILE GMBH & CO. KG, Velbert (DE)

(72) Inventor: Markus Schmitz, Bochum (DE)

(73) Assignee: EMKA BESCHLAGTEILE GMBH & CO. KG, Velbert (DE)

( * ) Notice: Subject to any disclaimer, the term of this patent is extended or adjusted under 35 U.S.C. 154(b) by 241 days.

(21) Appl. No.: 17/922,671

(22) PCT Filed: May 3, 2021

(86) PCT No.: PCT/EP2021/061582
§ 371 (c)(1),
(2) Date: Nov. 1, 2022

(87) PCT Pub. No.: WO2021/224189
PCT Pub. Date: Nov. 11, 2021

(65) Prior Publication Data
US 2023/0265695 A1 Aug. 24, 2023

(30) Foreign Application Priority Data
May 5, 2020 (DE) .................... 10 2020 112 148.2

(51) Int. Cl.
*E05D 7/10* (2006.01)
*E05C 9/02* (2006.01)
(Continued)

(52) U.S. Cl.
CPC ............ *E05D 7/1061* (2013.01); *E05C 9/025* (2013.01); *E05D 3/02* (2013.01); *E05D 11/1014* (2013.01);
(Continued)

(58) Field of Classification Search
CPC ... E05D 7/1061; E05D 7/1066; E05D 7/1072; E05D 7/1077; E05D 11/10;
(Continued)

(56) References Cited

U.S. PATENT DOCUMENTS 883,418 A * 3/1908 Metzker ................ E05D 15/505 16/232
2,261,146 A * 11/1941 Dow ..................... E05D 15/507 16/230
(Continued)

FOREIGN PATENT DOCUMENTS

DE 10134249 A1 * 1/2003 ............. E05C 9/066
DE 20301039 U1 6/2004
(Continued)

OTHER PUBLICATIONS

International Preliminary Report on Patentability issued Nov. 17, 2022 pertaining to International Application No. PCT/EP2021/061582, 10 pages.
(Continued)

*Primary Examiner* — Jeffrey O'Brien
(74) *Attorney, Agent, or Firm* — Thompson Hine LLP

(57) ABSTRACT

A hinge lock for locking a door leaf with respect to a door frame and for pivoting the door leaf with respect to the door frame. The hinge lock has a first hinge element for arranging on the door leaf and a second hinge element for arranging on the door frame. The first hinge element and the second hinge element can be locked with respect to one another by means of a bolt which can be moved back and forth in a locking direction between an unlocking position and a locking position. The bolt can be moved back and forth between the unlocking position and the locking position by means of a
(Continued)

drive rod which can be moved transversely to the locking direction. The disclosure further relates to a door having a hinge lock.

14 Claims, 16 Drawing Sheets

(51) Int. Cl.
*E05D 3/02* (2006.01)
*E05D 11/10* (2006.01)
*E05C 9/18* (2006.01)

(52) U.S. Cl.
CPC ............ *E05C 9/028* (2013.01); *E05C 9/1841* (2013.01); *E05Y 2201/638* (2013.01); *E05Y 2201/686* (2013.01); *E05Y 2900/20* (2013.01)

(58) Field of Classification Search
CPC ............. E05D 11/1007; E05D 11/1014; E05D 11/1028; E05D 11/105; E05D 2011/0045; E05D 15/505; E05C 9/028; E05C 9/1841; E05C 9/025
USPC ........................... 16/270, 271, 272, 230, 231
See application file for complete search history.

(56) References Cited

U.S. PATENT DOCUMENTS

| | | | | | |
|---|---|---|---|---|---|
| 3,965,532 | A * | 6/1976 | Wigfall | E05D 7/12 | 16/270 |
| 3,969,788 | A * | 7/1976 | McCullough | E05D 11/1007 | 16/326 |
| 4,532,673 | A * | 8/1985 | Kim | E05D 15/524 | 16/233 |
| 5,120,087 | A * | 6/1992 | Pastva | E05D 11/00 | 292/22 |
| 5,193,308 | A * | 3/1993 | Davidian | E05D 7/12 | 16/382 |
| 5,548,927 | A * | 8/1996 | Song | E05D 15/505 | 49/193 |
| 5,595,408 | A * | 1/1997 | Jeche | E05C 9/06 | 292/37 |
| 6,000,550 | A * | 12/1999 | Simpson | H01L 21/67386 | 16/257 |
| 6,035,674 | A * | 3/2000 | Nickel | E05C 9/06 | 70/120 |
| 7,178,292 | B2 * | 2/2007 | Yamada | E05D 15/502 | 16/229 |
| 8,966,821 | B2 * | 3/2015 | Walker | E05D 15/505 | 49/382 |
| 10,017,973 | B2 * | 7/2018 | Höschler | E05D 7/1061 | |
| 10,280,665 | B2 * | 5/2019 | Rieboldt | E05D 7/1061 | |
| 10,590,687 | B1 * | 3/2020 | Cifers | E05D 7/12 | |
| 11,905,750 | B2 * | 2/2024 | Young | E05D 7/1011 | |
| 11,927,042 | B2 * | 3/2024 | Brewster | B64C 1/1469 | |
| 2003/0080567 | A1 * | 5/2003 | Peacock | E05C 9/043 | 292/3 |
| 2013/0081331 | A1 * | 4/2013 | Vullings | E05D 7/1011 | 16/231 |
| 2014/0259532 | A1 * | 9/2014 | Millard | E05D 11/1028 | 16/326 |
| 2015/0292249 | A1 * | 10/2015 | Alfredsson | E05B 65/48 | 70/2 |
| 2018/0044957 | A1 * | 2/2018 | Höschler | E05D 7/1066 | |
| 2018/0258675 | A1 | 9/2018 | Rieboldt | | |
| 2021/0140212 | A1 * | 5/2021 | Rieboldt | E05B 63/22 | |
| 2022/0136299 | A1 * | 5/2022 | Kaganov | E05D 15/505 | 16/232 |
| 2023/0175297 | A1 * | 6/2023 | Schmitz | E05C 9/021 | 49/383 |

FOREIGN PATENT DOCUMENTS

| | | | | |
|---|---|---|---|---|
| DE | 102015117505 B3 | 2/2017 | | |
| DE | 102017129427 B3 * | 11/2018 | E05B 63/22 | |
| EP | 3702566 A1 | 9/2020 | | |
| EP | 4339406 A1 * | 3/2024 | E05D 7/1061 | |
| EP | 4069924 B1 * | 7/2024 | E05B 1/003 | |

OTHER PUBLICATIONS

European Patent Office (ISA/EP), International Search Report (with partial English translation), International Application No. PCT/EP2021/061582, 6 pages, Sep. 1, 2021.

European Patent Office, Notification pursuant to B Article 94(3) EPO (with machine generated English translation), European Patent Application No. 21724227.0, 14 pages, Jan. 16, 2024.

* cited by examiner

HINGE LOCK

This application is a national stage filing of International (PCT) Application No. PCT/EP2021/061582, corresponding to International Publication No. WO 2021/224189 filed on May 3, 2021, which in turn claims priority to German Application No. 10 2020 112 148.2 filed on May 5, 2020. The entire contents of both of those applications are hereby incorporated by reference.

The disclosure relates to a hinge lock for locking a door leaf in relation to a door frame and for pivoting the door leaf in relation to the door frame, having a first hinge element for arranging on the door leaf and a second hinge element for arranging on the door frame, wherein the first hinge element and the second hinge element are lockable with respect to each other via a bolt which is movable to and fro in a locking direction between a release position and a locking position. The disclosure further relates to a door having a hinge lock.

BACKGROUND

Hinge locks are very generally understood as meaning in one case hinges which can be used as hinges, on the one hand, but also as a lock, on the other hand, and therefore said hinge locks to this extent have a dual function. If a corresponding hinge lock is used, for example, on a door, the door leaf can thus be pivoted about the hinge lock and, as a result, opened; however, the door leaf can likewise also be locked in relation to the door frame via the hinge lock. The range of application of such hinge locks therefore extends to entirely different spheres of technology. They can be used, for example, not only on doors, but also on windows, flaps, covers, hatches or other pivotable closing elements.

Hinge locks generally have two hinge elements which are movable with respect to each other, wherein the first hinge element is arranged on a door leaf which is pivotable in relation to the door frame, and the second hinge element is correspondingly arranged on the door frame. The two hinge elements are lockable with respect to each other via a bolt which is movable to and fro in a locking direction between a release position and a locking position. In the locking position, the two hinge elements are connected pivotably to each other, and therefore the hinge lock can then act in this respect as a hinge.

In the release position, the two hinge elements are no longer connected to each other, and therefore, in this position, the door leaf is then no longer fixed in relation to the door frame at least via the corresponding hinge lock, and the door can be opened. As a rule, the door leaf is then pivoted about a pivot axis which is arranged in an end region of the door leaf opposite the hinge lock.

Owing to the dual function of the hinge lock, a plurality of hinge locks are frequently arranged on a door. The first hinge elements are generally here all arranged on the same side of the door leaf, but in opposite end regions of the door leaf. An end region is understood as meaning in one case the region in the vicinity of the door edges at the edge of the door leaf, in which hinges or locks are conventionally arranged. If all of the hinge locks are in the locking position, the door leaf is fixed in relation to the door frame and is therefore not movable. In order to open the door, the bolts of the hinge locks which are arranged in an end region of the door can be transferred from the locking position into the release position and the door leaf can then be pivoted about the pivot axis of the locked hinge locks of the other end region. The locked hinge locks then act as hinges.

Depending on which of the hinge locks are locked and released, the door leaf can therefore be correspondingly opened either to the left or to the right. Theoretically, it is also possible to arrange the hinge locks at the top and bottom or even in all four end regions of the door leaf. The door leaf could then be pivoted, for example, either upward or downward. Furthermore, it is also possible to switch all of the hinge locks of the door into the release position. The door leaf is then no longer fixed in relation to the door frame, but rather it can then be removed from the door frame.

A corresponding hinge lock is described, for example, in DE 10 2015 117 505 B3. This hinge lock has a linearly movable bolt which is movable to and fro between the locking position and the release position via a pivotable hand lever. Although this actuation may be successful in practice, it may lead to problems, for example, in the case of hinge locks to which access is difficult. This is because, in order to lock or to release the hinge lock, the bolt has to be moved by hand directly on the corresponding hinge lock. Specifically in the case of high doors, as are used in particular in large server cabinets or switch cabinets, the upper hinge locks can, however, then frequently not be reached particularly by smaller people without additional aids, for example a step ladder.

SUMMARY

Taking this as a starting point, the disclosure is based on the concept of specifying a hinge lock which permits easier locking and release even in the event of a hinge lock to which access is difficult.

This can be achieved in the case of a hinge lock of the type mentioned at the beginning in that the bolt is movable to and fro between the release position and the locking position via a drive rod which is movable transversely with respect to the locking direction.

By means of the actuation via a drive rod which is movable transversely with respect to the locking direction, the bolt can be reliably locked and released from a position away from the bolt or actual hinge lock. The longer the drive rod, the further the actuating point can be situated from the actual hinge lock, and therefore, to a certain extent, the actuation can be locally decoupled from the actual hinge lock. This local decoupling therefore also makes it possible to move the bolts of hinge locks which themselves are accessible only with difficulty.

With regard to the movement of the drive rod, it may be advantageous if the latter is movable to and fro linearly perpendicularly to the locking direction of the bolt. This configuration permits a large distance between the bolt and the actual actuating point of the drive rod. The drive rod can to this extent be movable parallel to the pivot axis of the door leaf. In particular if the hinge lock is arranged too far up and therefore cannot be reached by a person, the drive rod which is arranged parallel to the pivot axis makes it possible for the hinge lock to be actuated even by smaller people. The drive rod can be coupled to the bolt in the manner of a corner deflection or 90 degree deflection.

Furthermore, it may be advantageous if the drive rod is part of an actuation device.

In a development of the drive rod, it is proposed that the latter is configured as a flat rod. A corresponding flat rod can extent parallel to the door leaf and therefore requires only little space. A flat rod also may be successful with regard to transmitting the movement of the drive rod to the bolt, and this will be explained in more detail below with regard to the further configuration of the drive rod. Furthermore, it is, however, also possible for the drive rod to be configured as a profiled rod or round rod.

So that the bolt can be moved via the drive rod, it may be advantageous if the drive rod has at least one guide slot in which the bolt, in particular a guide element of the bolt, is guided. The movement of the drive rod can be converted into a movement of the bolt oriented transversely or perpendicularly thereto via the guide slot. In its structural respect, the guide slot can be configured as an elongated hole, and the bolt or a guide element of the bolt can be accommodated in the elongated hole of the drive rod. The bolt can be mounted in such a manner that it can be moved only linearly in the locking direction, and therefore the bolt is reliably movable to and fro between the release position and the locking position by the movement of the drive rod.

With regard to the movement of the bolt by means of the drive rod, it may be advantageous, in a development, if the guide rod has two guide slots, in particular arranged parallel to each other. In this respect, a bolt can then be guided in the two guide slots, and this permits a reliable movement of the bolt and reduces the risk of the bolt and/or the drive rod tilting.

Furthermore, it may be advantageous if the guide slot has an S-shaped configuration. The effect achieved by this configuration can be a reliable movement of the bolt with comparatively little effort. The guide slot can have a starting region and an end region which can be oriented parallel to each other. A rectilinear or a curved connecting region can be provided between the starting region and the end region, thus resulting overall in a S-shaped profile. S-shaped does not inevitably mean here that the guide slot has to be curved; instead, it may also have exclusively rectilinear regions. The starting region and the end region of the guide slot can extend parallel to the pivot axis, with the result that, during a movement of the drive rod, the bolt which is movable only in the locking direction does not move if the bolt is guided in the starting region or in the end region. Only when the drive rod has been moved in such a manner that the bolt is guided in the connecting region is a movement of the drive rod converted into a corresponding transverse movement of the bolt.

By means of an S-shaped guide slot, the initial actuation force required for moving the bolt can be reduced. This is because the transition between the starting region and the connection region and between the end region and the connection region means that the bolt can initially only be moved slightly during a movement of the drive rod, and only then, in the middle part of the connection region, can the movement of the drive rod initiate, for example, a movement, which is oriented transversely with respect thereto, of the bolt to the same size. In order to move the bolt, it is advantageous if the guide slot or if the connection region of the guide slot encloses an angle of 45° with the locking direction. In the case of a plurality of guide slots, in particular two guide slots, the latter can be formed parallel to one another.

With regard to the configuration of the hinge lock, it furthermore may be advantageous if the first hinge element is of multi-part configuration and has a hinge base and a bolt holder, wherein the bolt is movably accommodated between the hinge base and the bolt holder. A corresponding multi-part configuration affords advantages in respect of the mounting of the elements since the latter can be mounted successively. The bolt can be accommodated in linearly movable fashion between the hinge base and the bolt holder, and therefore the bolt can slide to and fro between the hinge base and the bolt holder as it moves in the locking direction between the locking position and the release position. The hinge base and the bolt holder can serve to this extent as a guide for the bolt in the locking direction.

Furthermore, it may be advantageous if the bolt is accommodated captively between the hinge base and the bolt holder. The hinge base and the bolt holder can embrace the bolt in the connected position in such a manner that the bolt cannot be removed but rather is held securely between the two elements. The bolt can thereby always be reliably moved in the locking direction even after relatively long operation and possibly also after a certain amount of wear, and cannot slip out of the hinge element. To this extent, this then also ensures reliable operation of the hinge lock for a relatively long period of time. In order to remove the bolt from the hinge lock, the bolt holder and the hinge base then first have to be separated from each other.

In order to ensure a reliable movement of the bolt, it may be advantageous if the bolt is guided in the hinge base and/or in the bolt holder. For guidance, in particular on opposite sides, the bolt can have at least one guide element which is configured as a guide pin and which can be guided in a corresponding guide of the bolt holder or of the hinge base. Advantageously, one, in particular two, guide elements of one side of the bolt are guided in the bolt holder and one, in particular two, guide elements of an opposite side of the bolt are guided in the hinge base. This dual guide permits a reliable movement of the bolt. It can furthermore be ensured by means of two guide elements per side of the bolt that the bolt does not tilt during a corresponding movement in the locking direction and that to this extent reliable release and locking can be ensured. The hinge base and/or the bolt holder can have guides which are configured in the manner of elongated holes and which to this extent permit a linear movement of the bolt. The elongated holes of the respective elements can be arranged parallel to one another, and the elongated holes of the hinge base and of the bolt holder can lie opposite one another and can be aligned with one another.

At least one guide element can extend through the slot of the drive rod and can extend into the guide of the lock holder or into the guide of the hinge base. By means of this configuration, the drive rod is connected to the first hinge element with a form fit, and a movement of the drive rod leads to the guide element of the bolt moving both in the guide slot and in the guides of the bolt holder and/or of the hinge base.

With regard to the arrangement of the drive rod, it may be advantageous if the latter is arranged, at least in sections, between the bolt and the hinge base. The drive rod can therefore slide to and fro during a movement between the bolt and the hinge base and can here correspondingly move the bolt to and fro in the locking direction. The drive rod can therefore be arranged at least in sections in the hinge lock. The hinge base and the bolt can have corresponding sliding surfaces which facilitate sliding of the drive rod to and fro. The configuration of the drive rod as a flat rod may be advantageous in particular in this connection since this configuration makes it possible for the hinge lock to have only a small construction volume and little space is required for the drive rod between the bolt and the hinge base. Alternatively, it is also possible for the drive rod to be arranged at least in sections between the bolt and the bolt holder. Also in the case of this configuration, the drive rod can slide to and fro in the hinge lock and can correspondingly move the bolt in the locking direction.

Furthermore, it may be advantageous if the bolt holder laterally embraces the bolt. The bolt holder can in this respect have two guide surfaces between which the bolt is guided and which serve in this respect for laterally linearly guiding the bolt. By means of this configuration, the bolt is not only also additionally guided, but rather it also simplifies the mounting since the bolt holder is arranged in a position that is fixedly defined by the guide surfaces in relation to the bolt. A subsequent alignment is therefore basically not required.

In a development of the bolt, it is proposed that the bolt has a bolt portion and a movement portion. The bolt portion can be block-shaped and in this respect can provide a high degree of stability, and therefore the bolt can securely connect the two hinge elements to each other in the locking position. The movement portion can be configured to be planar and can extend perpendicularly to the bolt portion. The movement portion can be guided in the bolt holder, and the guide elements can likewise be arranged on the bolt portion. In this respect, the movement portion can serve for ensuring a movement of the bolt between the locking position and the release position. The movement portion can be arranged parallel to the drive rod such that a compact design is produced.

The bolt portion can be guided in the hinge base. The hinge base can have guide surfaces which constitute a further guide for the bolt and permit only a linear movement between the locking position and the release position.

The bolt portion can have at least one recess through which, in the locking position, the second hinge element, in particular a stiffening rib of the second hinge element, can extend. The recesses can extend perpendicularly to the locking direction. It is advantageous if the bolt portion has two, in particular parallel, recesses. A respective stiffening rib of the second hinge element can extend through said two recesses, and therefore the bolt can laterally embrace the second hinge element, or the reinforcing ribs of the second hinge element, in the locking position. Furthermore, the reinforcing ribs can therefore also serve as a guide for the bolt. During a movement from the release position into the locking position, the recesses of the bolt can be moved via the reinforcing ribs of the second hinge element. Furthermore, the recess can divide the bolt portion into two bolt blocks. In the case of two recesses, the latter can divide the bolt portion correspondingly into three bolt blocks.

In a further advantageous configuration, the hinge base can have a guide protrusion which, in the release position, engages in the recess of the bolt. If two recesses are provided, two guide protrusions can correspondingly also be provided which can each engage in one recess of the bolt. During the transfer from the locking position into the release position, the bolt or the bolt blocks is or are then moved to and fro between the guide protrusions of the hinge base and the reinforcing ribs of the second hinge element.

With regard to the connection of the hinge base to the bolt holder, it may be advantageous if the hinge base is connected releasably to the bolt holder. This simplifies the mounting of the hinge lock since first of all the bolt can be placed into the hinge base and then the bolt holder can be connected releasably to the hinge base. The bolt can then be accommodated here between the hinge base and the bolt holder with a form fit, but in linearly moveable fashion.

Furthermore, it is advantageous if the hinge base and the bolt holder are connectable to each other via at least one mounting pin. Both the hinge base and the bolt holder can have corresponding recesses or bores through which the mounting pin can reach. It is furthermore also possible for the mounting pin to be connected fixedly to the bolt holder or to the hinge base. In this configuration, only the other element then correspondingly has a recess or a bore for the mounting pin. The mounting pin can have a thread, and therefore the bolt holder and the hinge base can then be connected to each other via a nut which can be screwed onto the mounting pin. Furthermore, it is also possible for the mounting pin to be part of the door leaf and, for example, to be connected fixedly thereto. The mounting pin can be welded, for example, to the door leaf and in this respect configured as a welded pin.

Furthermore, it may be advantageous if the bolt holder and the hinge base are connected to each other via two mounting pins. This configuration ensures that the two elements are reliably fixed. Furthermore, it is possible for the hinge base also to be able to be connected to a door or a door leaf via the or via the same mounting pin(s). In this respect, the hinge base and the bolt holder can then be jointly connected to the door leaf via one hinge pin or optionally also a plurality of hinge pins. Furthermore, it is also possible not to connect the elements directly to a door, but rather to a hinge strip. The mounting pin can then be, for example, part of the hinge strip and fastened in or to the latter.

The more precise configuration of the hinge strip and the mounting of the elements on the hinge strip will be described in more detail below.

With regard to the mounting pin, it may be advantageous if the latter extends perpendicularly to the locking direction and correspondingly in the normal direction with respect to the door leaf. In an alternative configuration, the mounting pin may, however, also extend parallel to the locking direction. In this configuration, the bolt holder can have a receiving socket, for example with an internal thread, and the hinge base can have, for example, a bore for the mounting pins. The mounting pin can then be screwed into the receiving socket and can thus connect the bolt holder to the hinge base. In this configuration, the hinge base can be connected to the door or to the hinge strip via other mounting pins. For the connection to the door or to the hinge strip, the hinge base can have a mounting portion which can extend parallel to the surface of the door or parallel to the hinge strip.

The bolt holder and the hinge base can each have, in particular planar, connecting protrusions, and the receptacles for receiving the mounting pin or the mounting pins can be arranged in the connection protrusions. The first hinge element can have a receiving groove in which the drive rod can be guided. The receiving groove can be produced by the two connection protrusions projecting in different directions and lying one on the other. The receiving groove can correspondingly be formed by the hinge base and the bolt holder. The receiving groove can extend perpendicularly to the locking direction and in the longitudinal direction of the hinge strip.

With regard to the configuration of the second hinge element, it may be advantageous if the latter is configured as a hinge bracket which is connectable to the door frame.

The second hinge element can have a mounting region for mounting on a door frame. The mounting region can have one, in particular two, mounting bores and, via the latter, can be screwed to the door frame. It is advantageous if the second hinge element is connected to a surface of the door frame, which surface is oriented parallel to the door leaf in the closed position of the door. The second hinge element can have a pivot pin defining a pivot axis. In the locking position, the first hinge element and therefore also the door leaf can be pivoted about the pivot axis of the second hinge element which is connected to the door frame. The second hinge element can have a connection region which connects the pivot pin to the mounting region. The connection region can extend perpendicularly to the door leaf when the door is closed. The connection region can have one, in particular two, reinforcing ribs which ensure that the second hinge element is sufficiently stable such that, even in the case of heavy doors, the door weight can be received by the corresponding connection region. The pivot pin can protrude, in particular laterally, in relation to the connection region, thus resulting in a T-shaped contour of the second hinge element.

The second hinge element can furthermore have a receiving region for receiving the bolt in the locking position. The receiving region can be arranged between the pivot pin and the mounting region, and the bolt can be retracted into said receiving region in the locking position in order thereby to secure the pivot pin in the hinge base.

For the corresponding receiving of the pivot pin, the hinge base can have a pivot pin receptacle. The pivot pin receptacle can embrace the pivot pin of the second hinge element in sections and to this extent can ensure reliable mounting of the door leaf on the door frame. The pivot pin receptacle or the edges of the pivot pin receptacle can furthermore act as a stop and in this respect can delimit the opening angle of the door leaf in relation to the door frame. The pivot pin receptacle can be divided and can have two pivot pin receiving regions. A part of the pivot pin can be accommodated in each of the pivot pin receptacles. The second hinge element or the connection region of the second hinge element can extend between the two pivot pin receiving regions. If the door is closed, the connection region of the second hinge element can then lie between the two pivot pin receiving regions.

It may be advantageous, in a development, if the pivot pin is secured in the locking position between the hinge base, in particular the pivot pin receptacle, and the bolt, in particular in the bolt portion. The bolt and the pivot pin receptacle can embrace the pivot pin of the second hinge element to this extent with a form fit such that only a rotational movement of the two hinge elements with respect to each other, rather than a translational movement of the two hinge elements with respect to each other, is possible. In this respect, the first hinge element and the second hinge element can then be pivotably connected to each other in the locking position. The first hinge element can be pivotable here about the pivot axis or about the pivot pin of the second hinge element.

In the release position, the bolt can no longer secure the pivot pin of the second hinge element, and therefore the two hinge elements are then movable in a translational manner with respect to each other. In this position, the door leaf can be removed, for example, from the door frame, or the door or the door leaf can be pivoted about a different pivot axis.

Furthermore, it may be advantageous if an emergency release is provided, with which the bolt can be transferred from the locking position into the release position. The emergency release can be actuable from both sides of the door and to this extent can ensure reliable opening of the door in an emergency situation. Via a corresponding emergency release, the bolt can be transferred from the locking position into the release position, but not back into the locking position.

The bolt holder, the hinge base and the bolt can be configured as injection molded parts and can be composed of plastic. Furthermore, the elements can also be composed of metal, in particular stainless steel or cast steel. The same applies to the drive rod, the actuation device and the second hinge element. The elements can also be composed of different materials.

Furthermore, with regard to the concept mentioned at the beginning, a door having a hinge lock is proposed, wherein the hinge lock is configured in the above-described manner. This affords the advantages already described with regard to the hinge lock.

It is advantageous if the second hinge element is arranged on the door frame and the first hinge element on the door leaf such that the door leaf is connected to the door frame via the hinge lock. For the connection of the door leaf to the door frame, a plurality of hinge locks which are arranged in opposite end regions of the door leaf may be advantageous. For example, four, six, eight or even more hinge locks can be provided depending on the height of the door leaf. The hinge locks can lie opposite one another in pairs and can be arranged in end regions of the door leaf. So that the first hinge elements can be connected to the second hinge elements, the first hinge elements can protrude, in particular laterally, in relation to the door leaf. It is also possible for the door leaf to have mounting recesses through which the second hinge element can extend and can extend into the first hinge element or into the pivot pin receptacles of the hinge base.

Furthermore, a hinge assembly having at least two hinge locks for locking a door leaf in relation to a door frame and for pivoting the door leaf in relation to the door frame is proposed, wherein the hinge assembly has an actuation device for jointly actuating the hinge locks. Features of the hinge assembly and the operation of the actuation will be described in more detail below. Should inconsistencies with respect to the above description arise in the descriptions below, the above description is applicable.

A hinge assembly is understood as meaning in one case elements which are joined together and which can be preassembled together and can then be used as an assembly.

By means of the actuation device, the at least two hinge locks, in particular all of the hinge locks, of the hinge assembly can be jointly locked and also released. It is therefore not necessary to lock or to release each of the hinge locks individually, which is associated with a significant simplification and saving on time. It is advantageous if each hinge assembly can be actuated only via a single device with which all of the hinge locks of the hinge assembly can then be centrally actuated together. This does not exclude hinge locks of the hinge assembly also sometimes being able to be actuated, in particular additionally, individually.

In a development, it is proposed that the hinge assembly has a hinge strip which can be arranged on the door leaf and which has a plurality of mounting points for the mounting of one hinge lock each. Depending on at how many points the door leaf is intended to be connected to the door frame, a corresponding number of mounting points can be arranged on the hinge strip. In the case of smaller doors, for example, just two mounting points and therefore also two hinge locks per end region of the door may be sufficient. In the case of higher or heavier doors which accordingly also have to be connected to the door frame at a plurality of points, four mounting points and therefore correspondingly then four hinge locks can also be used per hinge assembly.

The hinge locks can be at the same distance from one another, and therefore a reliable connection of the door leaf to the door frame is produced. Furthermore, it is also possible for the hinge strip to have more mounting points than are ultimately used for the hinge locks. For example, it is conceivable for the hinge strip to have four mounting points, but for a hinge lock to be mounted only at two of said mounting points.

With regard to the configuration of the hinge lock, it may be advantageous if the latter has a first and a second hinge element which are pivotable with respect to each other for the movement of the door leaf about a pivot axis. For this purpose, the first hinge element can be arranged on the door leaf or on the hinge strip which can be arranged on the door leaf, and the second hinge element can be arranged on the door frame. By means of the pivotability of the two hinge elements, the door leaf is then accordingly also pivotable in relation to the door frame.

With regard to the arrangement of the hinge strip on the door leaf, it furthermore may be advantageous if the hinge strip extends parallel to the pivot axis. The first and second hinge elements of the plurality of hinge locks of a hinge assembly can all be pivotable about the same pivot axis, and therefore a single pivot axis is thus assigned to the hinge assembly. The door leaf generally has a rectangular shape, and the pivot axis can extend parallel to the longer edge of the door leaf. Accordingly, the hinge strip can also be arranged parallel to the longer edge of the door.

Furthermore, with regard to the pivot axis, it is proposed that the latter is located outside the hinge strip. This configuration affords structural advantages since the door leaf can then more easily be opened and closed and a collision of the elements can be prevented.

With regard to the mounting, it may be advantageous if the hinge strip and the hinge locks are configured as a preassembled mounting unit. This affords advantages in respect of the mounting. This is because, before the hinge strip is arranged on a door leaf, the hinge locks can be connected to the hinge strip and can then be arranged as a mounting unit on the door leaf in one step. Simple and rapid mounting is thereby made possible since the two mounting steps, i.e. the mounting of the hinge locks on the hinge strip and the hinge strip on the door leaf, are separated from each other. In particular if a hinge strip has a multiplicity of hinge locks and/or in the case of a plurality of hinge strips arranged on a door leaf, this preassembly results in a significant time saving.

It furthermore may be advantageous if the hinge strip can be arranged optionally either on the inner side of the door leaf or on the outer side of the door leaf. This variability makes it possible for door leaves and door frames of differing types and with different geometrical requirements to be connected to the hinge strip. The various advantages which arise from the mounting on the outside or on the inside will be explained in more detail below. For conversion, for example, from mounting on the inside to mounting on the outside, only very few changes have to be undertaken at the hinge strip and at the hinge locks.

With regard to the configuration of the hinge strip, it may be advantageous if the latter comprises a basic element for arranging on the door leaf, and two limb elements. The hinge strip can therefore have a substantially U-shaped cross-sectional form, and the two limb elements can be arranged parallel to each other and perpendicularly to the basic element. Furthermore, however, it is also possible for only the first limb element to enclose a right angle with the basic element and for the second limb element to enclose a smaller angle, for example in the range of 30 to 70 degrees, with the basic element. By means of this chamfering of the second limb element, the elements arranged in the hinge strip can be, in particular additionally, fixed in the hinge strip. The smaller angle also means that less construction space is required. It is advantageous if the first limb element lies closer to the pivot axis of the hinge assembly than the second limb element. The first limb element can in this respect be assigned to the edge of the door leaf and the second limb element can point toward the center of the door leaf.

With regard to the configuration of the hinge locks, it may be advantageous if the second hinge element and the first hinge element are lockable with respect to each other via a bolt which is movable to and fro in a locking direction between a release position and a locking position.

With regard to the mounting, it may be advantageous if the first hinge element is connected to the hinge strip. The second hinge element can be arranged on the door frame, and therefore, after the hinge strip is arranged on the door leaf, the door is correspondingly pivotable in relation to the door frame.

In a development, it is proposed that the hinge strip has, in particular preassembled mounting pins, in particular welded pins, for the mounting of the first hinge elements. The hinge locks or the first hinge element can be securely connected to the hinge strip via the mounting pins. The mounting pins can be connected fixedly to the hinge strip and configured as welded pins. The mounting pins can have a thread, and therefore the first hinge element can then be connected to the hinge strip via a nut. The respective mounting pins can be part of the mounting points of the hinge strip such that at least one mounting pin is available at each mounting point. It is advantageous if each mounting point has two mounting pins. This ensures that the first hinge elements are reliably connected to the hinge strip.

Furthermore, it may be advantageous if the hinge strip has a plurality of mounting recesses for the mounting of the hinge locks. The mounting recesses can be part of the mounting points, and each mounting point can be assigned a mounting recess. The mounting recesses can extend through the first limb element and the basic element. The mounting recesses can be adapted to the hinge locks, in particular to the first hinge element, in particular to the hinge base, such that the hinge base can be placed during the mounting in a predefined position in the hinge strip or in the corresponding mounting recess. This simplifies the mounting or the connection of the hinge locks to the hinge strip. When the hinge base is connected to the hinge strip, the pivoting pin receptacle of the hinge base can protrude in relation to the strip. This is made possible as far as the pivot axis is not arranged in the hinge strip itself, but rather is spaced apart therefrom. With regard to the pivot axis, it furthermore may be advantageous if the latter is arranged spaced apart from the outer side of the door leaf and is arranged on that side of the door leaf which is opposite the door frame.

It may be advantageous if the mounting pins extend through the hinge strip for the connection of the hinge base to the bolt holder. In this way, not only can the hinge base be connected to the hinge strip, but at the same time the bolt holder can also be connected to the hinge base via the same mounting pins. The mounting pins can extend here perpendicularly to the basic element of the hinge strip. To this extent, the respective bolt holders can also be connected to the respective hinge base at the respective mounting points, in each case via two mounting pins in one scenario.

In order to lock or to release the bolts of the hinge locks, it may be advantageous if the bolts of the respective hinge locks are movable to and fro together between a release position and a locking position via the actuation device. In this way, all of the bolts of a hinge assembly can be moved simultaneously from the release position into the locking position or from the locking position into the release position by a single actuation. The door can therefore be locked and released very rapidly.

For the corresponding actuation, it may be advantageous if the actuation device has at least one drive rod for moving at least one bolt and a drive device for moving the drive rod. During a corresponding movement in the locking direction, the bolts can move parallel to the basic element of the hinge strip. The drive rod can move here parallel to the pivot axis or to the longitudinal axis of the hinge strip and perpendicularly to the locking direction.

In a development, it is proposed that the bolts of a plurality of hinge locks, in particular two hinge locks, are movable with one drive rod. This configuration can ensure a reliable joint actuation of the bolts. Two drive rods can be provided in the case of four hinge locks and therefore also four bolts. The corresponding drive device can be arranged between the two drive rods and can then jointly actuate the latter. To this extent, a plurality of drive rods can be movable with one drive device.

With regard to the configuration of the drive device, it may be advantageous if the latter has a rotatable actuation element, the rotational movement of which can be transferred into a linear movement of an actuation rod. The effect achieved by this configuration is that the bolts can be moved to and fro between the locking position and the release position via, for example, a rotatable handle, a latch, a pivot lever or else via an actuation by a tool. The actuation element can be accessible from the outer side of the door leaf, and therefore all of the hinge locks of a hinge assembly can be locked and released by hand.

The actuation rod can be configured as a toothed rack and can extend flat and parallel perpendicularly to the basic element of the hinge strip. The actuation element can be rotationally coupled to a pinion, and the pinion can mesh with the actuation rod for the linear movement of the actuation rod. For this purpose, the actuation rod can be configured as a toothed rack with a plurality of teeth arranged next to one another or else with a plurality of recesses which are arranged next to one another and in which the teeth of the pinion can engage. Alternatively, for the conversion of the rotational movement into a linear movement, a belt drive or a spindle drive are also possible.

For the movement of the drive rods, it may be advantageous if, in order to drive two drive rods, the actuation rod is connected to them on opposite sides. The actuation rod can therefore be connected to a respective drive rod at the upper and lower end. It is advantageous if the actuation rod is releasably connected to the drive rods at the corresponding ends. In practice, it may be advantageous, for example, if the actuation rod is hooked into the drive rod. For this purpose, the actuation rod can have connecting portions configured at both ends in the manner of hooks, and the drive rod can have connection portions configured correspondingly as recesses. It is also possible for drive rods not to be connected to the actuation rod, but rather to be connected to other drive rods which are connected to the actuation rod. To this extent, the drive rods can be arranged successively one behind another and also more than two drive rods can be moved via the actuation rod.

Furthermore, it may be advantageous if the drive device has a drive housing which is connected to the hinge strip. The drive device can therefore be fastened in the hinge strip or connected to the latter via the hinge housing. The hinge strip can have a mounting point for the mounting of the drive device. The mounting point can comprise mounting pins via which the drive housing can be connected, in particular releasably, to the hinge strip. The mounting pins for mounting the drive device can be configured analogously to the mounting pins for the mounting of the first hinge element. To this extent, the mounting pins can extend through the drive device or through the drive housing and can then be connected to the hinge strip via nuts, for example. The drive housing can serve as a mounting for the pinion and for the actuation element. In the event of an actuation, the actuation element and the pinion which is rotationally coupled to the actuation element can therefore be rotated in relation to the drive housing.

Furthermore, it may be advantageous if the drive housing is connected to a linear guide for guiding the movement of the actuation rod. The linear guide can therefore ensure a reliable movement of the actuation rod and the latter cannot tilt or become caught during a movement. Furthermore, by means of the connection of the linear guide to the drive housing, the linear guide can also be coupled to the hinge strip, and therefore the latter accordingly does not move together with the actuation rod.

With regard to the drive device, it may be advantageous if the latter is configured as a preassembled mounting unit. The drive device can therefore be inserted as a whole into the hinge strip and then connected to the latter, which simplifies the mounting overall. When the drive device is mounted in the hinge strip, the drive housing can be connected to the hinge strip via the mounting bolts and the actuation rod can accordingly be connected here to the drive rods to be driven.

In a development of the drive device, it is furthermore proposed that the latter has a blocking device which prevents a movement of the actuation rod in a blocking position. If the blocking device is in the blocking position, the bolts of the hinge locks can then no longer be moved and, for example, if the hinge locks are in the locking position, the door can then be secured against inadvertent opening. The blocking device can comprise a locking cylinder configured in the manner of a lock, and can have a rotatable blocking tongue. In the blocking position, the blocking tongue can engage in a recess of the actuation rod such that the latter is then no longer movable. By blocking the movement of the actuation rod, a rotational movement of the actuation element can therefore also be blocked. The blocking device can be connected or can be connectable to the drive housing and configured as an alternatively usable additional module. To this extent, the blocking device can be inserted in the manner of a plug-in connection into the drive housing and connected to the latter. The housing can have a plurality of receptacles for the blocking device, and the blocking device can be connected to one of these receptacles, for example depending on the orientation of the hinge strip. The blocking device can also be preassembled as part of the drive device and then mounted together with the remaining components in the hinge strip.

With regard to the configuration of the hinge lock, it may be advantageous if the second hinge element, in particular the connection region of the second hinge element, extends through the hinge strip, in particular through the mounting recess for the respective hinge lock. The second hinge element can therefore also be preassembled. However, it may be advantageous in practice if the second hinge element is first of all connected to the door frame and the hinge strip together with the remaining parts of the hinge locks is first of all connected to the door leaf. The door leaf can then be very simply connected to the door frame. For this purpose, the bolts of the hinge locks merely have to be brought into a release position and the pivot pin of the respective second hinge elements correspondingly introduced into the respective first hinge element. If the two hinge elements have been correspondingly brought together, the bolts can be brought into the locking position such that the door leaf is then connected pivotably to the door frame. The mounting region of the second hinge element and the pivot pin of the second hinge element can then lie opposite each other with respect to the hinge strip.

Furthermore, it may be advantageous in particular with regard to the mounting on the outside if the hinge strip is arranged in a hinge strip cover. When mounted on the outside, only the hinge strip cover rather than the hinge strip can therefore be visible. Since the hinge strip is in any case not visible from the outside when mounted on the inside, a corresponding hinge strip cover is then accordingly not absolutely necessary. The hinge strip cover can cover the hinge strip all the way around. The hinge strip cover can have mounting recesses which can be configured corresponding to the mounting recesses of the hinge strip, and therefore the hinge strip cover does not impair the mounting of the hinge locks or make it difficult. At the upper and at the lower end, the hinge strip cover can be closed via closure elements which can be inserted into the hinge strip cover. The hinge strip cover can also laterally embrace the door leaf from one side.

In order to connect the hinge strip cover to the hinge strip, the hinge strip can have mounting elements in particular at the upper and at the lower end. Said mounting elements can have wing-like protrusions which can engage in or behind the hinge strip cover. The mounting elements can be configured as pressure pieces and can clamp the hinge strip cover against the hinge strip. The hinge strip cover can be connected to the hinge strip with a form fit via the mounting elements.

During the mounting, the mounting elements can be introduced in a mounting position into the hinge strip, and then, by means of an, in particular, 90 degree, rotation, the protrusions of the mounting elements can engage in the hinge strip cover or behind the latter and can thus connect the hinge strip cover to the hinge strip. In order to remove the hinge strip cover, the mounting elements then first have to be rotated back again by 90 degrees. The hinge strip cover can therefore be connected releasably to the hinge strip and without externally visible screws.

Furthermore, a door having a door leaf, a door frame and a hinge assembly is proposed, wherein the hinge assembly is configured in the above-described way. This affords the advantages that have already been described with regard to the hinge assembly.

With regard to the door, it may be advantageous if the hinge strip is arranged on the outer side of the door leaf "Outer side" means the side of the door leaf that faces away from the door frame. In the event of this mounting on the outside, the free door cross section can be larger than in the event of mounting on the inside since, on the door frame, there only has to be sufficient space for mounting the second hinge element or for mounting the mounting region of the second hinge element.

In order to connect the door leaf to the hinge strip or the hinge assembly, use can be made of mounting pins, for example in the form of screws, in particular hexagon socket screws. The latter can reach from the inner side of the door leaf through the door and can then be screwed into the hinge strip. The mounting pins advantageously do not penetrate here the hinge strip cover, and therefore they can accordingly not be seen on the outer side of the door leaf.

In an alternative configuration, it may be advantageous if the hinge strip is arranged on the inner side of the door leaf "Inner side" means the side of the door leaf that faces the door frame. In this configuration, the hinge strip is not visible from the outside, but, for this purpose, the free cross section of the door frame is reduced since not only is sufficient space required on the inner side of the door leaf for mounting the second hinge lock, but in addition the hinge strip also has to have space between the door frame and the door leaf.

The door leaf can be configured as a sheet metal door leaf and, in the edge regions, can have chamfers facing in the direction of the door frame. The hinge strip can lie against the chamfer, in particular in the case of mounting on the inside. In the case of mounting on the outside, the hinge strip cover can overlap the chamfer. The door frame can have a step which projects in the direction of the free frame cross section and which has a mounting surface arranged parallel to the door leaf. The second hinge element can be mounted on said mounting surface. The step can furthermore have a chamfer which faces in the direction of the door leaf and which is provided with a seal which, in the closed position of the door leaf, is compressed by the latter.

With regard to the door, it furthermore may be advantageous if the door leaf has mounting recesses. These mounting recesses can coincide with the mounting recesses of the hinge strip, and therefore the mounting recesses are aligned with one another and the hinge strip can be reliably connected to the door leaf. In addition, the door leaf can also have recesses for the actuation device, and therefore the latter can be actuated from the outer side of the door leaf. By contrast, in the event of mounting on the outside, a corresponding mounting recess of the door leaf for the actuation element of the drive device is not required. In this case, it suffices if the hinge strip and the hinge strip cover have corresponding recesses for the actuation element and optionally also for the blocking device.

Furthermore, a door having two hinge assemblies is proposed. The hinge assemblies can be arranged here in opposite end regions of the door leaf. The individual hinge locks of the two hinge assemblies can then lie opposite one another in pairs.

Furthermore, a method for mounting a hinge assembly is proposed, wherein the hinge assembly is configured in the above-described manner. It is proposed that first of all the hinge assembly is preassembled and then the hinge assembly is mounted on the door leaf. During the mounting of the hinge assembly, it may be advantageous if first of all the hinge base is mounted in the hinge strip. Subsequently, the drive rod can then be mounted. Subsequently, the bolt can then be mounted. Subsequently, the bolt holder can then be mounted. Subsequently, the, in particular already preassembled, drive device can then be mounted. After the mounting of the hinge assembly, the latter can then be arranged on the door leaf.

Whether the hinge assembly is intended to be connected to the inner side or to the outer side of the door leaf basically has no effect on the mounting sequence. In the event of mounting on the outside, the hinge strip can be pushed into the hinge strip cover as a first step. After the first hinge element is then connected to the hinge strip, the hinge strip cover can be connected to the hinge strip via the mounting element.

BRIEF DESCRIPTION OF THE DRAWINGS

Further details and advantages of the invention will be explained in more detail below with reference to the attached drawings of schematic exemplary embodiments. In the drawings.

DETAILED DESCRIPTION

Hinge locks 1 serve for locking a door leaf 10.1 in relation to a door frame 10.2 and for pivoting the door leaf 10.1 in relation to the door frame 10.2, and therefore they have a dual function to this extent. Before the more precise configuration of the hinge lock 1 and the actuation of the hinge lock 1 are described in more detail below, the basic function of the hinge locks 1 will first of all be described in more detail.

Figure 1:
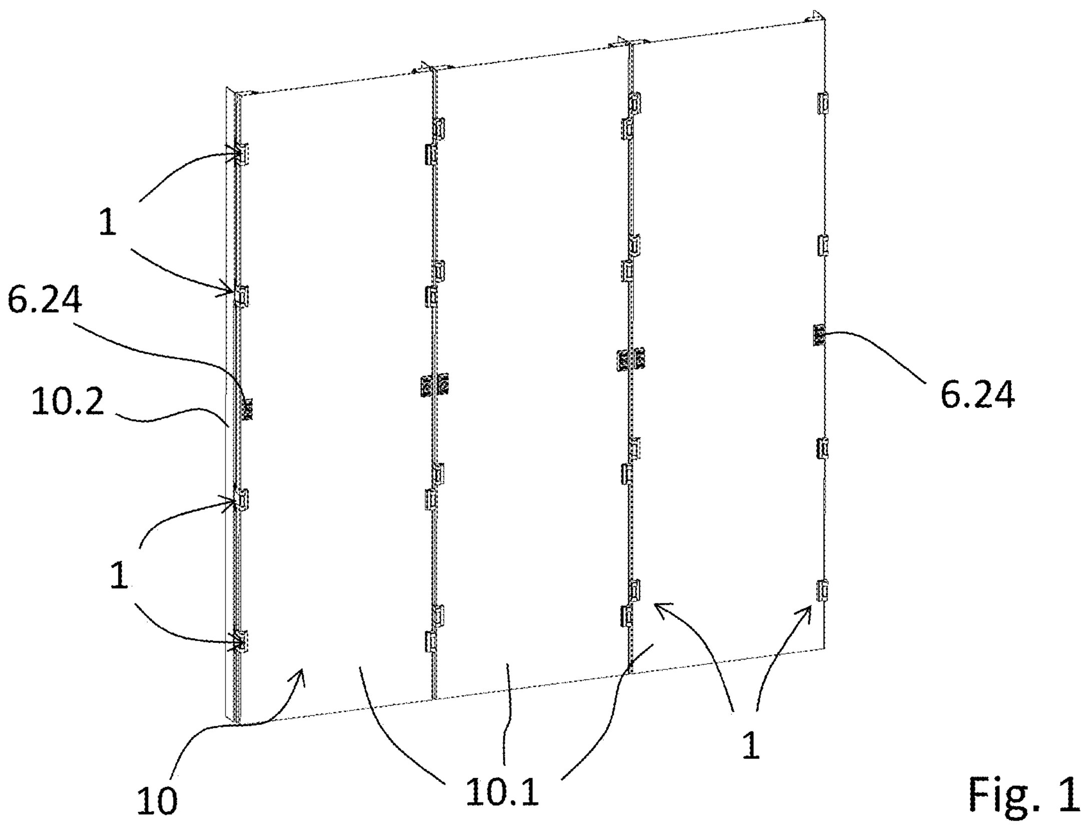
FIG. 1 shows a plurality of door leaves which are arranged next to one another and are each connected to the respective door frame via eight hinge locks.

In the illustration of FIG. 1, a plurality of doors 10 arranged tightly next to one another and each having a door leaf 10.1 and a door frame 10.2 are shown. The door leaves 10.1 of the doors 10 are rectangular in configuration and here have a significantly greater height than width. Typically, such door arrangements are used for large servers or switch cabinets.

As can furthermore be seen in FIG. 1, each of the doors 10 which are shown has a total of eight hinge locks 1, and therefore each door leaf 10.1 can firstly be pivoted and open to the left, i.e. about the respective four left hinge locks 1, and also about the four right hinge locks 1. In order to open the door leaf 10.1 to the left, the left hinge locks 1 then have to be locked and the right hinge locks 1 released. If the door leaf 10.1 is intended to be opened to the right, the right hinge locks 1 have to be locked and the left hinge locks 1 released. If all eight hinge locks 1 of a door 10 are locked, the door leaf 10.1 is fixed in relation to the door frame 10.2, and the door leaf 10.1 can correspondingly not be moved. If all eight hinge locks 1 are released, the door leaf 10.1 can be removed from the door frame 10.2.

Figure 2:
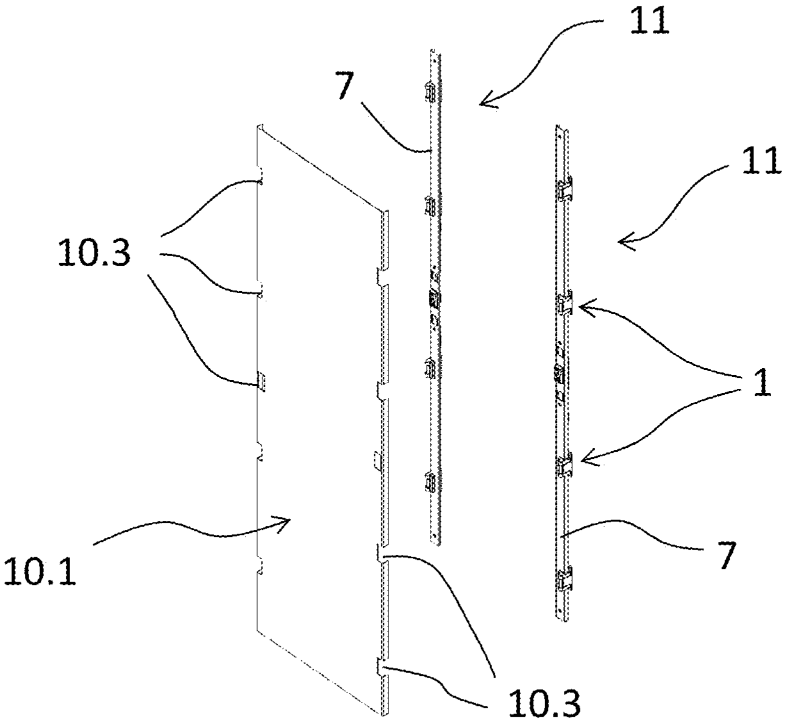
FIG. 2 shows a detailed view of a door having two hinge assemblies arranged on the inner side of a door leaf.

As can be seen in the illustration of FIG. 2, the hinge locks 1 of an end region of the door leaf 10.1, i.e. the right hinge locks 1 and the left hinge locks 1, are each arranged in a hinge strip 7. The hinge strip 7 together with the respective hinge locks 1 forms a hinge assembly 11, and therefore each of the door leaves 10.1 illustrated in FIG. 1 is connected to the door frame 10.2 via two hinge assemblies 11.

Figure 5A:
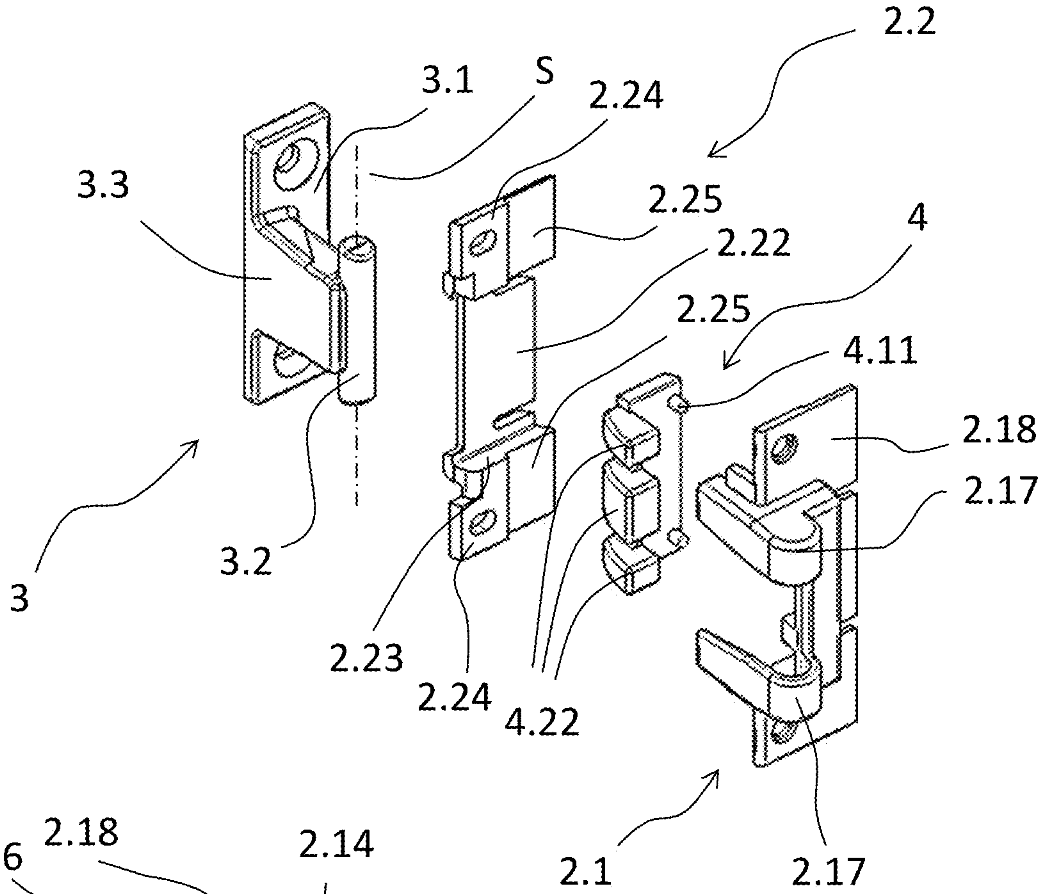
FIG. 5*a* shows an exploded view of the hinge lock.
Figure 5B:
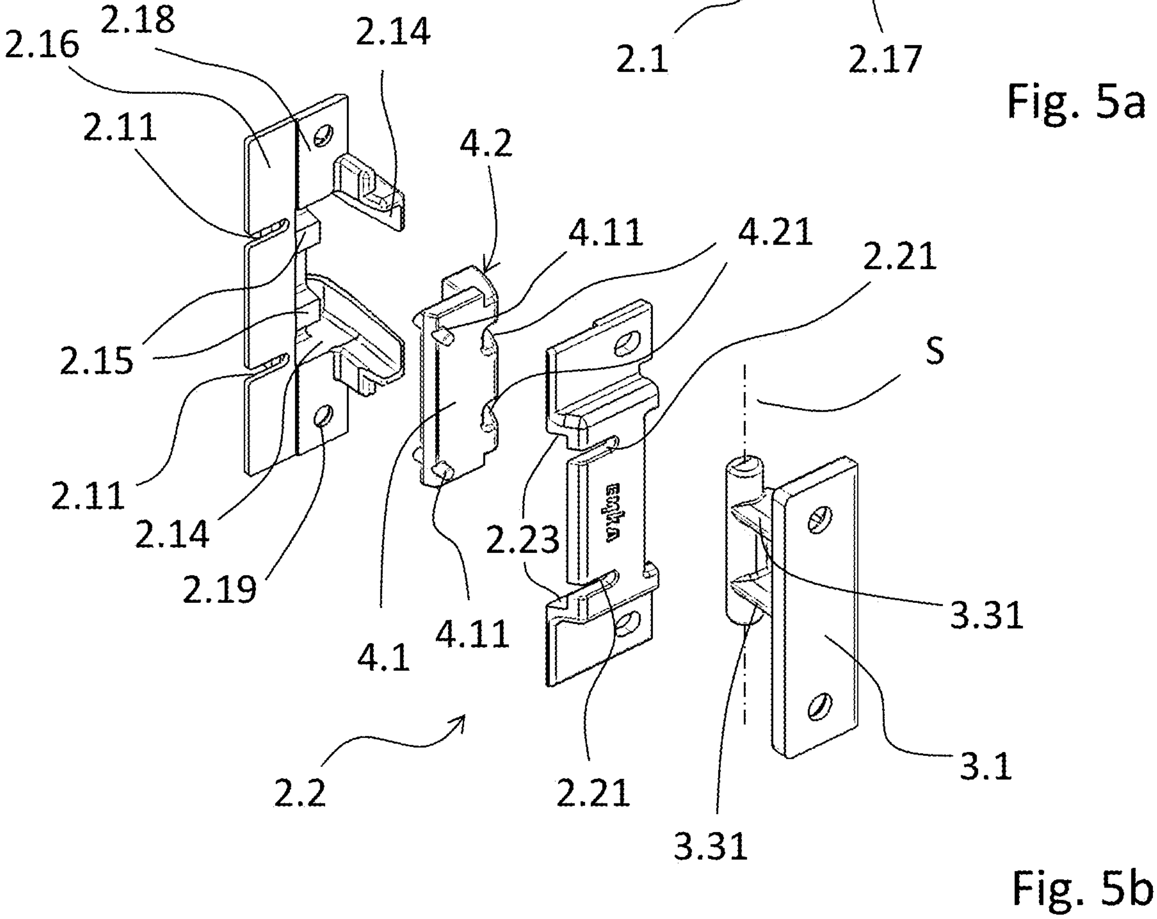
FIG. 5*b* shows an exploded view of the hinge lock.

Before various configurations and mounting possibilities of the hinge strips 7 and the hinge assemblies 11 will be entered into more detail below, the design of the individual hinge locks 1 will now first of all be described in more detail with reference to FIGS. 5*a* and 5*b*. In the illustration of FIGS. 5*a* and 5*b*, a hinge lock 1 is shown in an exploded illustration. The hinge locks 1 which can be seen in FIGS. 1 and 2 correspond to those which are illustrated in FIGS. 5*a* and 5*b*.

The hinge locks 1 essentially consist of two parts, namely a first hinge element 2 and a second hinge element 3. In the locking position V, the first hinge element 2 and the second hinge element 3 are pivotably connected to each other such that the door leaf 10.1 can then be correspondingly pivoted about these hinge locks 1 or about the pivot axis S of the hinge locks 1. With regard to the hinge assembly 11 having a plurality of hinge locks 1, the hinge elements 2, 3 of each hinge lock 1 of a hinge assembly 11 are pivotable about the same pivot axis S, and therefore each hinge assembly 11 can be assigned a pivot axis S. Accordingly, all of the hinge elements 2, 3 of a hinge assembly 1 are pivotable relative to one another about the same pivot axis S. In the release position E, the two hinge elements 2, 3 are then no longer coupled pivotably to each other, but rather they are movable in a translational manner relative to each other such that the door leaf 10.1 can then be correspondingly pivoted about another pivot axis S or the door leaf 10.1 can be removed from the door frame 10.2, as has already been described above.

The first hinge element 2 consists of three elements, namely a hinge base 2.1, a bolt 4 which is movable to and fro in a locking direction R, and a bolt holder 2.2. The bolt holder 2.2 and the hinge base 2.1 act here as guides for the bolt 4, and the bolt 4 is captively accommodated between said two elements, and therefore the bolt 4 can be removed only when the hinge base 2.1 and the bolt holder 2.2 are separated from each other. Both the hinge base 2.1 and the bolt holder 2.2 have guides which are denoted by 2.11 and by 2.21, respectively, and in which a guide element 4.11 configured in the manner of a guide pin is in each case guided. During a movement of the bolt 4 in the locking direction R, the guide elements 4.11 are then moved in the corresponding guides 2.11, 2.21 and a movement of the bolt 4 in some other way is prevented. As is apparent in particular in FIG. 5*b*, the bolt 4 has a total of four guide pins, of which in each case two are guided in the guide 2.11 of the hinge base 2.1 and two in the guide 2.21 of the bolt holder 2.2.

In addition, the bolt holder 2.2 also has a lateral guide for the bolt 4, as can be seen in FIG. 5*a*. A bolt sliding surface 2.22 is set back for this purpose, thus producing a type of receptacle with two lateral guide surfaces 2.23 which then laterally embrace and guide the bolt 4.

As can furthermore be seen, the bolt 4 has a substantially L-shaped cross section and it consists of a quite planar movement portion 4.1 and a bolt portion 4.2 arranged perpendicularly thereto. The movement portion 4.1 is arranged between the hinge base 2.1 and the bolt holder 2.2 and is moved to and fro between the locking position V and the release position E by a drive rod 6.1, as will be described in more detail below with reference to the other figures. The bolt portion 4.2 is configured in the form of a block and is therefore also significantly more stable than the movement portion 4.1. This is accompanied by the fact that, in the locking position V, the bolt portion 4.2 ensures that the pivot pin 3.2 is accommodated between the bolt portion 4.2 and the hinge base 2.1 or the pivot pin receptacle 2.17 of the hinge base 2.1 and is therefore sometimes exposed to comparatively high forces, this also being associated with the size and the weight of the door leaf 10.1.

Furthermore, the bolt portion 4.2 has two recesses 4.21 which divide the bolt portion 4.2 into three bolt blocks 4.22. As can be seen with reference to FIG. 5*b*, the hinge base 2.1 has two guide protrusions 2.15 which engage precisely in the recess 4.21 of the bolt portion 4.2 and therefore additionally serve for laterally guiding the bolt portion 4.2. Furthermore, the hinge base 2.1 also has additional lateral guide surfaces 2.14 which likewise laterally guide the bolt portion 4.2.

In addition, the division of the bolt portion 4.2 into three is also adapted to the configuration of the second hinge element 3, which is configured in the manner of a hinge block. As can be seen in FIG. 5*b*, the second hinge element 3 has a mounting region 3.1 with a flat surface via which the second hinge element 3 can be connected to the door frame 10.2. The pivot pin 3.2, the longitudinal axis of which forms the pivot axis S of the hinge lock 1 and therefore also the pivot axis of the door leaf 10.1 in relation to the door frame 10.2, is arranged spaced apart from said mounting region 3.1. The pivot pin 3.2 is connected to the mounting region 3.1 via a connection region 3.3. The mounting region 3.1 has two reinforcing ribs 3.31 which can be seen in FIG. 5*b* and which are aligned with the guide protrusions 2.15. To this extent, in the locking position V, the three bolt blocks 4.22 of the bolt 4 embrace the two reinforcing ribs 3.31 of the second hinge element 3 and, in the release position E, embrace the two guide protrusions 2.15 of the hinge base 2.1. During a movement between the locking position V and the release position E, the bolt 4 or the bolt portion 4.2 thus moves either between the reinforcing ribs 3.31, in order to secure the hinge pin 3.2 in the hinge pin receptacle 2.17, or between the guide protrusions 2.15, in order to release the hinge pin 3.2 in said release position E.

Figure 6A:
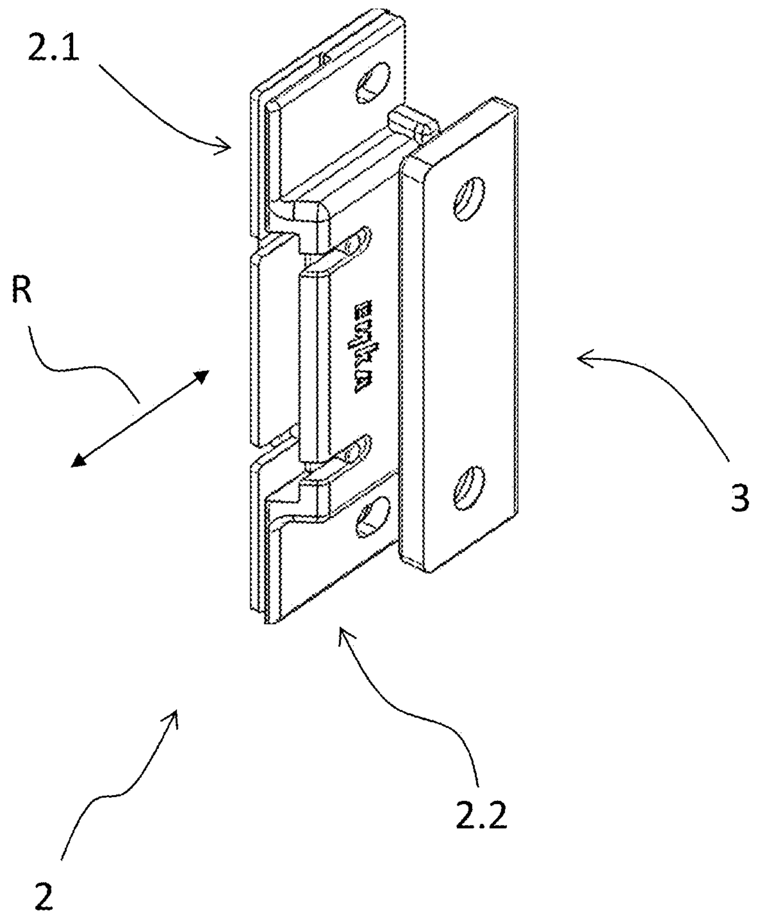
FIG. 6*a* shows the hinge lock according to FIGS. 5*a* and 5*b* in a perspective view.

In order to connect the hinge base 2.1 to the bolt holder 2.2, the two elements have corresponding bores, and therefore the hinge base 2.1 can be connected to the bolt holder 2.2 via a screw connection. The corresponding bores of the bolt holder 2.2 are arranged on a connection protrusion 2.24, and the bores of the hinge base 2.1 on a mounting portion 2.18, which likewise protrudes somewhat. These protrusions result, behind the corresponding portions 2.18, 2.24, in a guide groove which extends through the first hinge element 1 perpendicularly to the locking direction R and which can also be seen in FIG. 6*a*. The bolt 4 is not illustrated in FIG. 6*a*, but the intermediate space between the hinge base 2.1 and the bolt holder 2.2, in which intermediate space the bolt 4 is arranged, can readily be seen. The corresponding surfaces of the intermediate space are each configured as drive rod sliding surfaces and denoted by 2.16 and by 2.25. The drive rod 6.1, not illustrated in FIG. 6*a*, and the functioning of which will be described in more detail below, is arranged in the groove-shaped intermediate space between the bolt 4 and the hinge base 2.1 in the central region, and between the bolt holder 2.2 and the hinge base 2.1 in the two outer regions.

The drive rod 6.1 is configured as a flat rod and is movable perpendicularly to the locking direction R and therefore in the longitudinal direction of the hinge strip 7. The drive rod 6.1 has a total of four S-shaped guide slots 6.11, of which in each case two are arranged in pairs and of which in each case two serve for driving a bolt 4, and therefore two bolts 4 can be moved to and fro with the drive rod 6.1. In addition, the guide elements 4.11 of the bolt 4, which guide elements are guided in the guides 2.11, 2.21 of the bolt base 2.1, are also guided in the guide slots 6.11 of the drive rod 6.1. This becomes clear with reference to FIG. 6*a*, for example. The two guide elements 4.11 which face the hinge base 2.1 and are guided in the guide 2.11 namely also penetrate the two guide slots 6.11 of the drive rod 6.1. Each guide element 4.11 is guided here in one of the guide slots 6.11. During a linear movement of the drive rod 6.1, the guide elements 4.11 then slide in the guide slot 6.11 and therefore move the bolt 4 forward or back in the locking direction R, depending on in which direction the drive rod 6.1 is moved.

Figure 4:
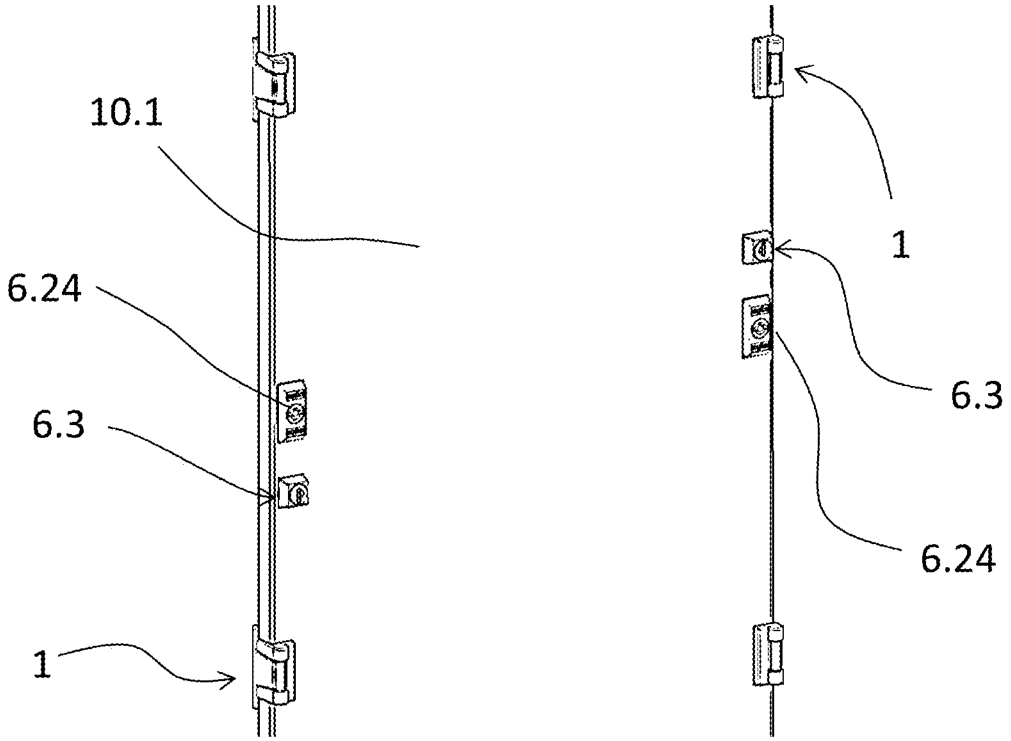
FIG. 4 shows a view of the outer side of the door leaf according to FIG. 2.
Figure 11:
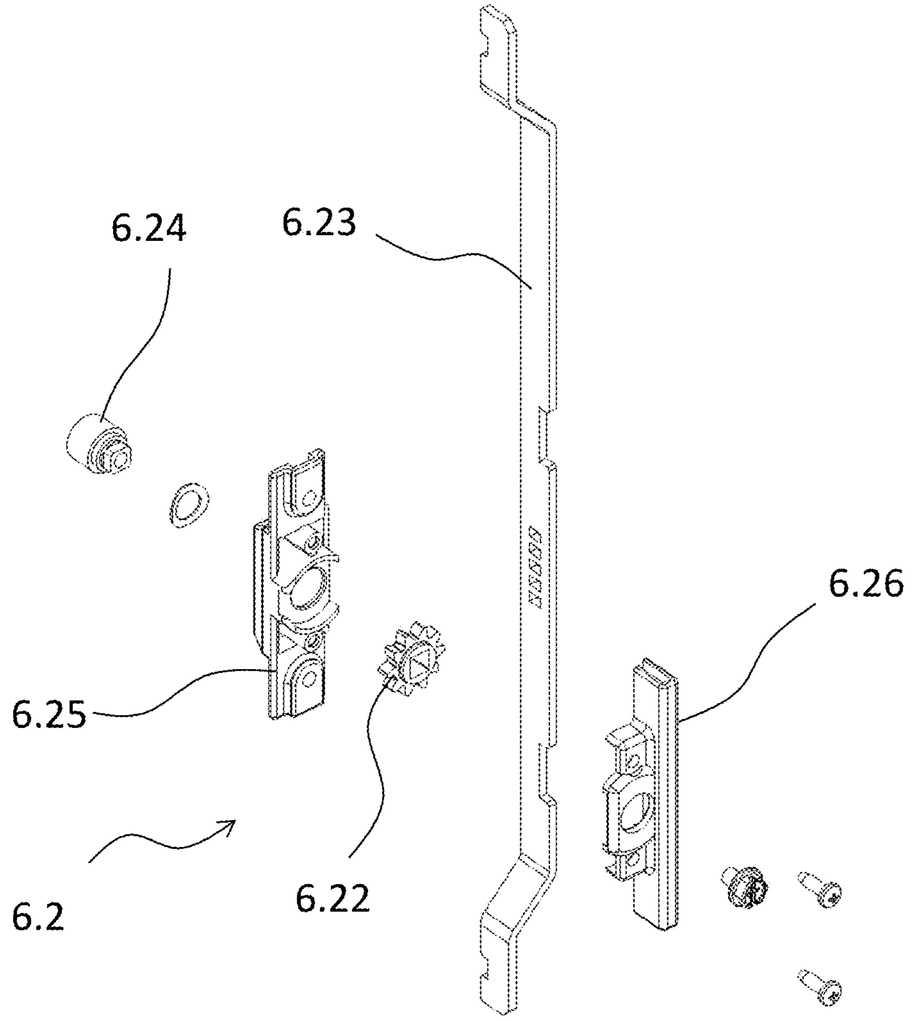
FIG. 11 shows an actuation device in an exploded illustration.
Figure 13A:
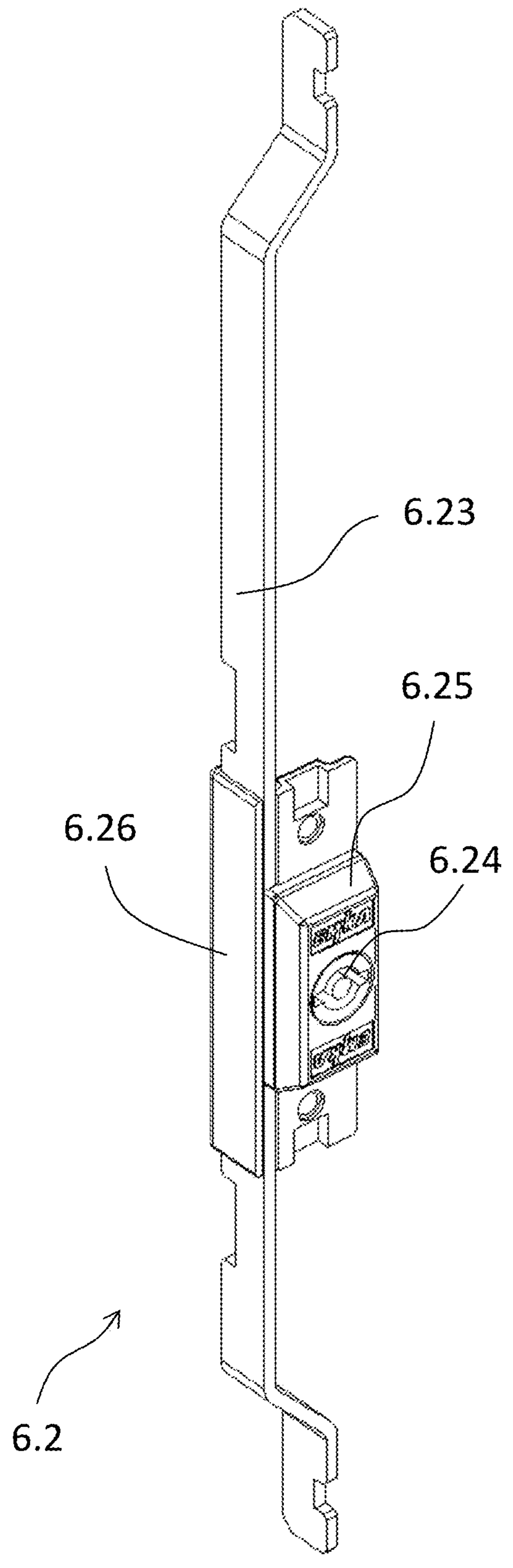
FIG. 13*a* shows the actuation device according to FIG. 11 with a blocking device according to FIGS. 12*a* and 12*b* in a perspective side view.
Figure 13B:
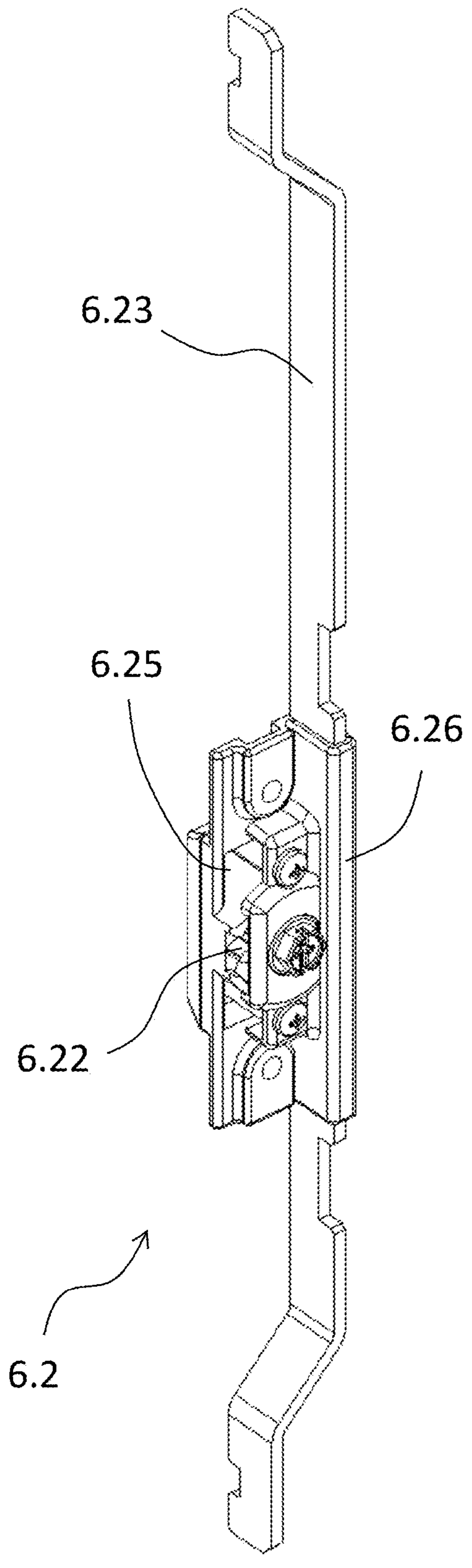
FIG. 13*b* shows the actuation device according to FIG. 11 with a blocking device according to FIGS. 12*a* and 12*b* in a perspective side view.
Figure 14:
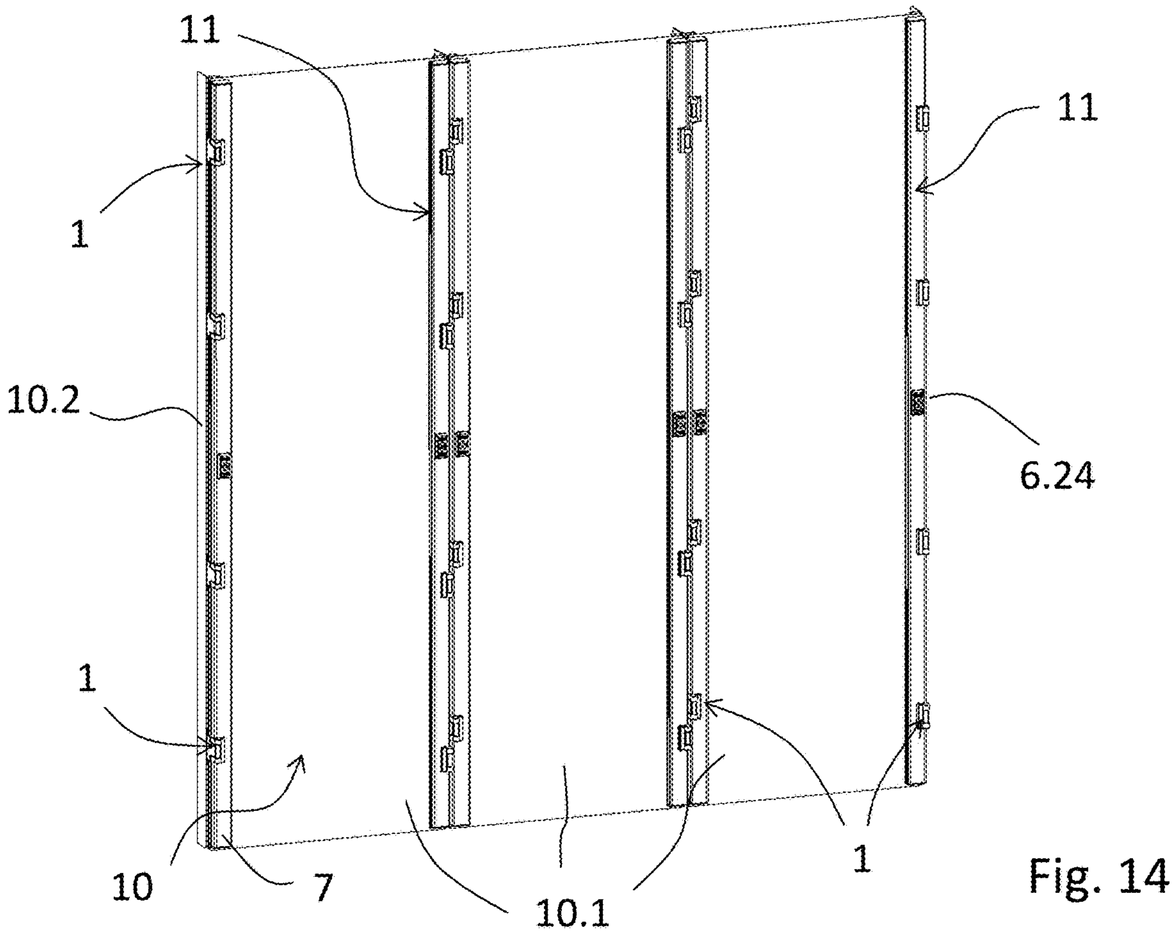
FIG. 14 shows a plurality of door leaves which are arranged next to one another and are each connected to the respective door frame via eight hinge locks, wherein the hinge locks are arranged on the outer side of the door leaves.
Figure 15:
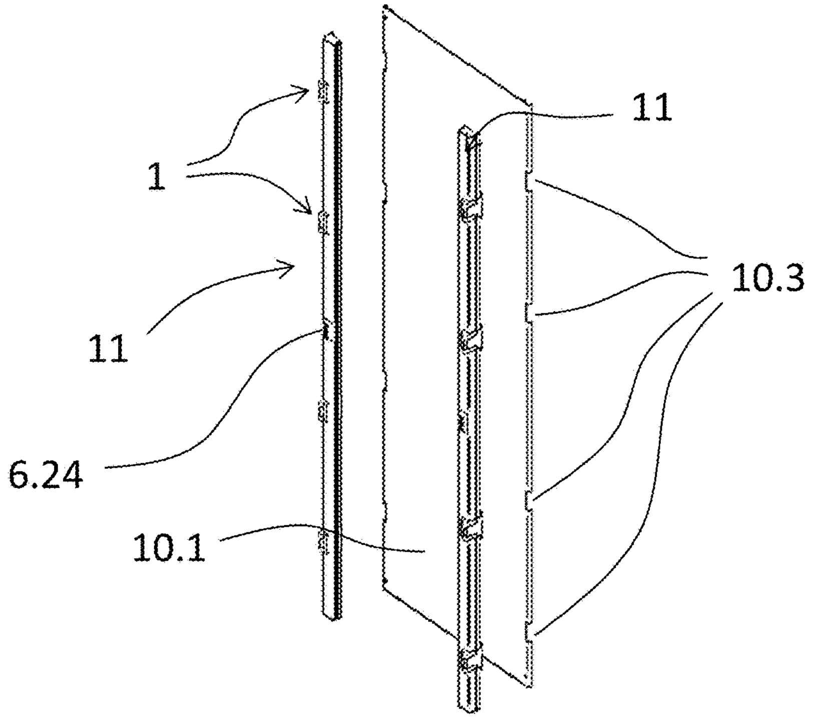
FIG. 15 shows a detailed view of a door according to FIG. 14 having two hinge assemblies arranged on the outer side of the door leaf.

In order to correspondingly move the drive rod 6.1, a drive device 6.2 which forms an actuation device 6 together with the drive rod 6.1 is provided. The design of the drive device 6.2 can be seen in the exploded illustration of FIG. 11. The drive device 6.2 first of all has a rotatable actuation element 6.24 which, in the exemplary embodiment, is configured as a tool actuation, as can also be seen, for example, with reference to FIG. 4 or FIG. 13*a*. Alternatively, however, the actuation element 6.24 can also be configured, for example, as a handle actuation means, as a knob actuation means or as a latch actuation means. The actuation element 6.24 is mounted rotatably in the drive housing 6.25, and the drive housing 6.25 is connected to the hinge strip 7 via mounting points 7.6 which can be seen in FIG. 7*a*. The drive housing 6.25 also serves as a mounting for a pinion 6.22 which is rotationally coupled to the actuation element 6.24 and accordingly is correspondingly moved during a rotational movement of the actuation element 6.24. The pinion 6.22 meshes with an actuation rod 6.23, which is configured as a toothed rack and has a plurality of recesses arranged next to one another, and, in the manner of a linear drive, leads to the actuation rod 6.23 being correspondingly moved linearly in the longitudinal direction of the hinge strip 7 during a rotation of the pinion 6.22. In order to guide the actuation rod 6.23, a linear guide 6.26 which is likewise connected to the drive housing 6.25 and is therefore not movable, is provided. The connection of the drive housing 6.25 and of the linear guide 6.26 via two screws can also be seen in FIGS. 13*a* and 13*b*. Furthermore, it can be seen, in particular in FIG. 13*b*, that the actuation element 6.24 is secured rotatably in the axial direction together with the pinion 6.22 via a screw and is also connected to the linear guide 6.26 by the drive housing 6.25.

The actuation rod 6.23 has, at both of its ends, hook-shaped connection portions via which it can be connected to two drive rods 6.1, i.e. to one on each side. During a movement of the actuation rod 6.23 via the actuation element 6.24, the two drive rods 6.1 are therefore jointly set in motion. Since each drive rod 6.1 is coupled to two bolts 4 in each case via the guide slots 6.11, which are arranged in pairs, all four bolts 4 of the hinge assembly 11 can therefore be moved to and fro together and in parallel between the locking position V and the release position E via the drive device 6.2. In a development, it would also be possible to also couple the drive rods 6.1 to further drive rods 6.1 in order therefore also to actuate a plurality of bolts 4 simultaneously.

Figure 12A:
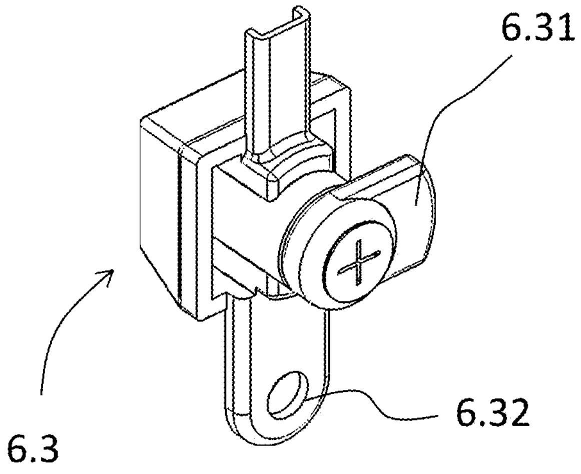
FIG. 12*a* shows a blocking device in a perspective front view.
Figure 12B:
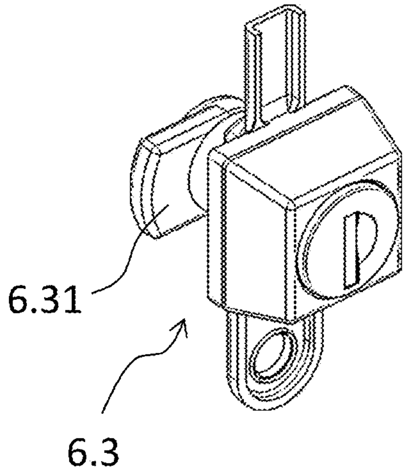
FIG. 12*b* shows a blocking device in a perspective rear view.

FIGS. 12*a* and 12*b* show a blocking device 6.3 which is likewise part of the drive device 6.2. The blocking device 6.3 has a movable blocking tongue 6.31 which is rotatable to and fro in the manner of a sash lock. In the blocking position, the blocking tongue 6.31 engages in the recesses, which can be seen in FIG. 11, of the actuation rod 6.23 and therefore then blocks a movement of the actuation rod 6.23. Owing to the fact that the actuation rod 6.23 is coupled to the actuation element 6.24, then, by blocking of the actuation rod 6.23, the actuation element 6.24 can also simultaneously no longer be rotated.

The blocking device 6.3 is insertable into the drive housing 6.25 via a connection region 6.32 and can be connected to the drive housing 6.25 via a screw. As can be seen with reference to the various positions of the blocking device 6.3 in FIG. 4, the blocking device 6.3 can be arranged both below and above the drive housing 6.25. Accordingly, the drive housing 6.25 correspondingly also has two receptacles into which the blocking device 6.3 can be inserted. The entire drive device 6.2, irrespective of whether a blocking device 6.3 is or is not provided, can be configured as a preassembled mounting unit which can be mounted as a whole on the hinge strip 7, as will also be explained in more detail below with reference to FIGS. 7*a* to 7*f*. This mounting unit can also be seen in FIGS. 13*a* and 13*b*.

As has already been described above, the hinge locks 1 which are arranged in an end region of the door leaf 10.1 are mounted together on a hinge strip 7. Said hinge assembly 11 is configured as a preassembled mounting unit and can be connected as a whole to the door leaf 10.1.

Figure 6B:
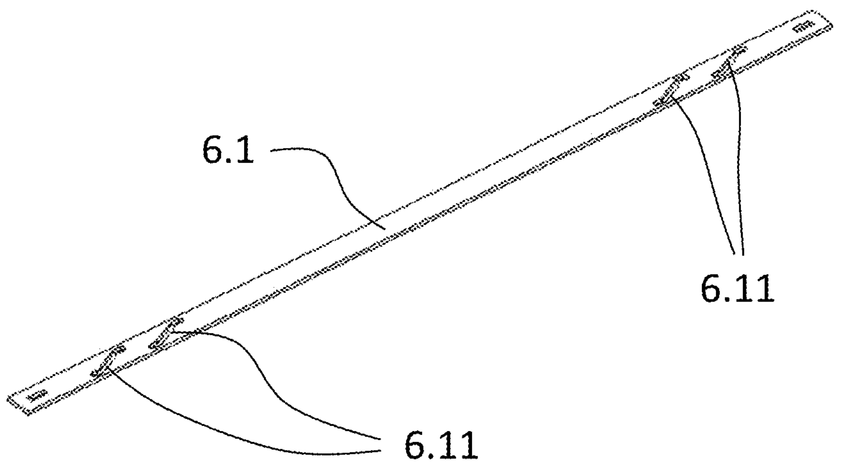
FIG. 6*b* shows a perspective view of a drive rod.

The figures show two different configurations of the hinge assembly 11, namely firstly, in FIGS. 1 to 4, a hinge assembly 11 which is connected to the inner side of the door leaf 10.1 such that the hinge strip 7 is not visible from the outside and lies concealed between the door leaf 10.1 and the door frame 10.2. In a different configuration in which the hinge strip is arranged on the outer side of the door leaf 10.1, as is illustrated, for example, in FIGS. 14 to 17, the hinge strip 7 and/or the hinge assembly 11 can also be seen from the outside. The hinge strips 7 and the hinge assemblies 11 of the two exemplary embodiments only differ slightly from one another in respect of their construction. It is therefore basically possible to preassemble a basic hinge strip which then, depending on whether the latter is intended to be used for mounting on the inside, on the inner side of the door leaf, or for mounting on the outside, on the outer side of the door leaf, can be adapted to the corresponding use situation with only little outlay. First of all, mounting of the hinge assembly 11 on the inside will now be described with reference to FIGS. 7*a* to 7*f* and the sectional views of FIGS. 8 to 10. The configuration of the hinge elements 2, 3, which is described in FIGS. 5*a*, 5*b* and 6, and also the drive device 6.2 are basically usable both for mounting on the inside and for mounting on the outside.

Figure 7A:
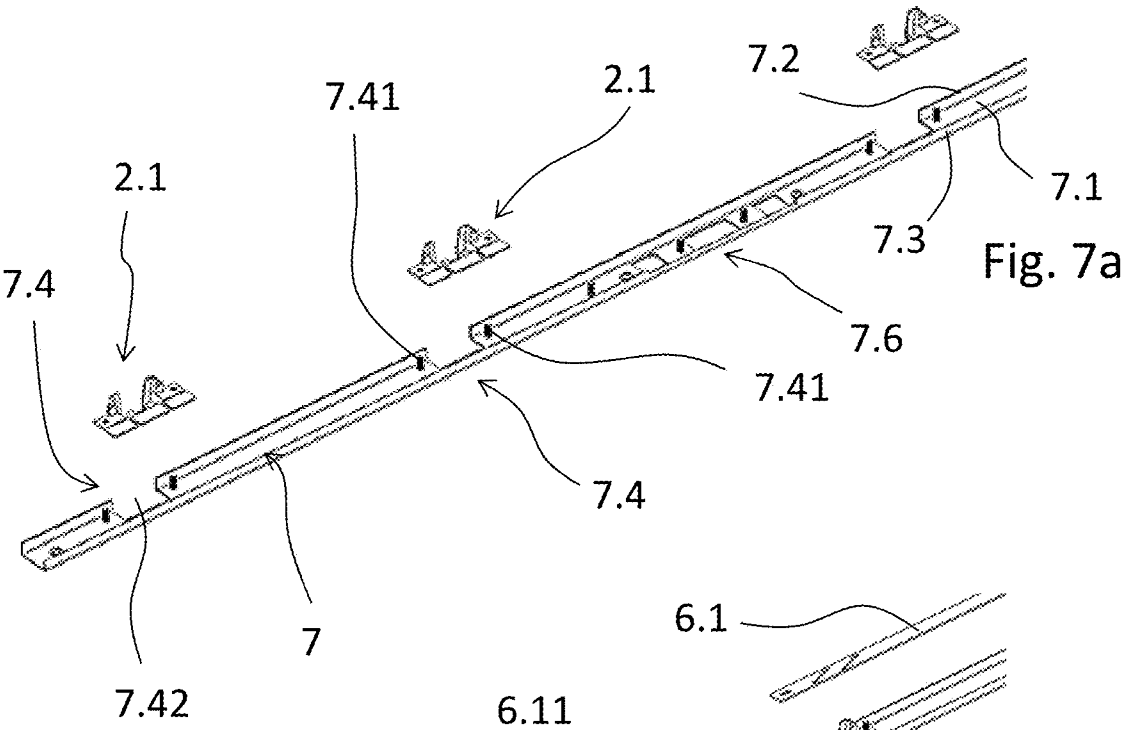
FIG. 7*a* shows a view of a mounting step of the mounting of a hinge assembly which can be mounted on the inner side of a door leaf.
Figure 7B:
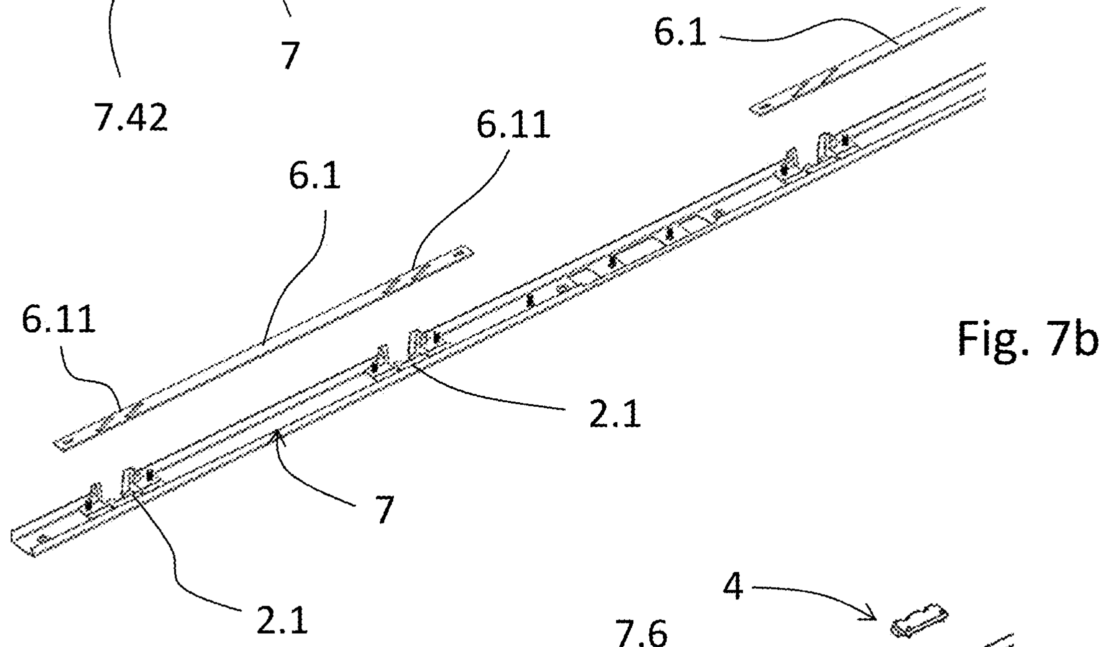
FIG. 7*b* shows a view of another mounting step of the mounting of a hinge assembly which can be mounted on the inner side of a door leaf.

According to the illustration in FIG. 7*a*, the hinge strip 7 has a basic element 7.1 which, after mounting, rests on the surface of the door leaf 10.1. A first limb element 7.2 extends perpendicularly from said basic element 7.1, said limb element, when the hinge strip 7 is mounted on the inside, lying against a chamfer of the door leaf 10.1, as can be seen in FIG. 8*b*. A second limb element 7.3 which is angled in relation to the basic element 7.1 and encloses a smaller angle with the latter than the first limb element 7.2 is arranged at that end of the basic element 7.1 which is opposite the first limb element 7.2. In the exemplary embodiment, the angle between the second limb element 7.3 and the basic element 7.1 is approximately 60 degrees. Furthermore, the hinge strip 7 has a plurality of mounting points 7.4 which each serve for the mounting of a hinge lock 1. The mounting points 7.4 each have two mounting pins 7.41 which extend perpendicularly to the basic element 7.1 and are fixedly connected to the basic element 7.1. The hinge locks 1 or the hinge base 2.1 and the bolt holder 2.2 can be connected both to one another and to the hinge strip 7 via said mounting pins 7.1. Furthermore, the mounting points 7.4 each have a mounting recess 7.42 which extends both through the basic element 7.1 and through the first limb element 7.2, as can be seen in the illustrations of FIGS. 7*a* to 7*e*.

During the mounting of a hinge lock 7, first of all the hinge base 2.1 is now placed into the mounting recess 7.42 such that the mounting pins 7.41 penetrate the bores provided for them in the hinge base 2.1. Owing to the size of the mounting recesses 7.42 that is matched to the hinge base 2.1 and owing to the position of the mounting pins 7.41, the hinge base 2.1 can be placed into the hinge strip 7 only in a predefined position. The rear side of the mounting portion 2.18 facing the pivot pin receptacle 2.17 then rests on the inner side of the basic element 7.1 of the hinge strip 7, and the pivot pin receptacle 2.17 protrudes in relation to the hinge strip 7, as can also be seen, for example, in FIGS. 8*a* and 8*b*.

After the mounting of the hinge base 2.1, the drive rod 6.1 is placed into the hinge strip 7 such that it extends parallel to the basic element 7.1. Owing to the drive rod sliding surface 2.16 which is set back in relation to the mounting portion 2.8, the drive rod 6.1 can be placed against the corresponding edge of the hinge base 2.1 such that the guides 2.11 lie below the guide slots 6.11 and, owing to the overlap, a substantially circular passage through the drive rod 6.1 and the hinge base 2.1 is produced.

Figure 7C:
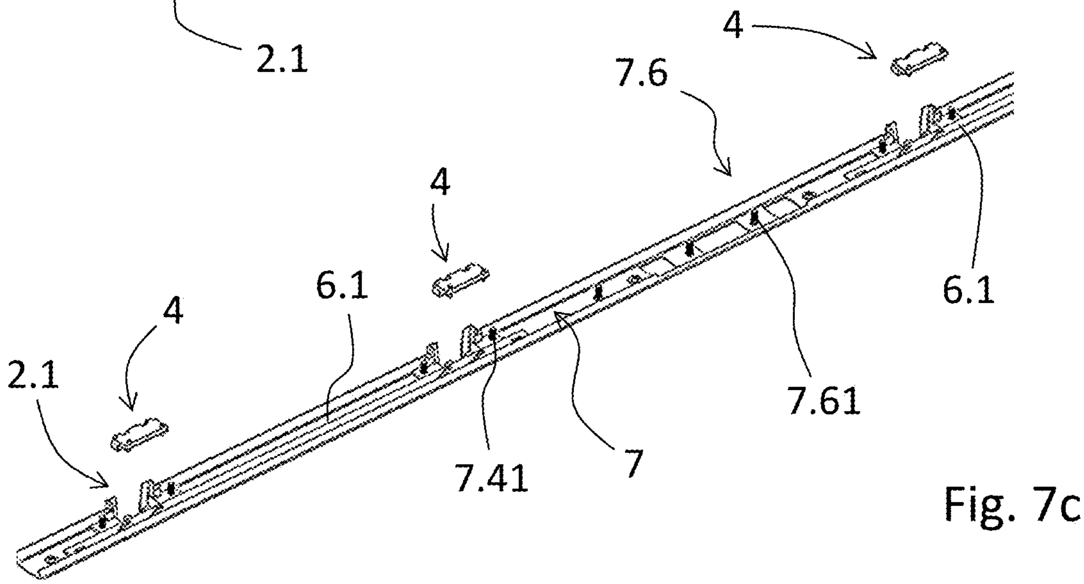
FIG. 7*c* shows a view of another mounting step of the mounting of a hinge assembly which can be mounted on the inner side of a door leaf.
Figure 7D:
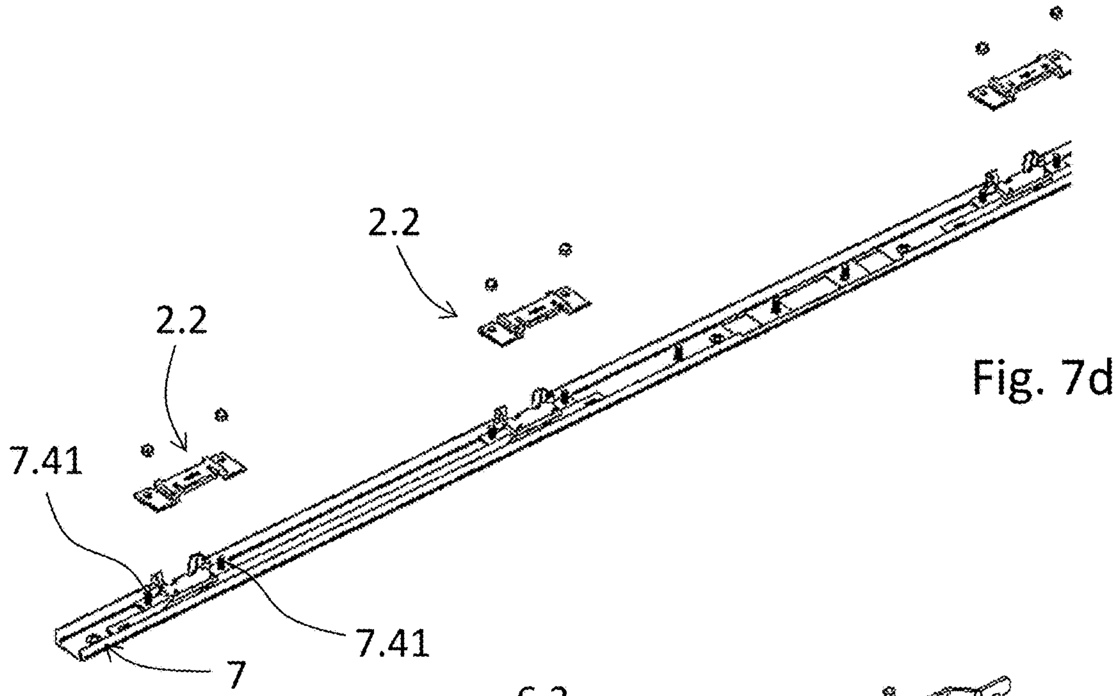
FIG. 7*d* shows a view of another mounting step of the mounting of a hinge assembly which can be mounted on the inner side of a door leaf.

In a next step, the bolt 4 is then placed into the hinge base 2.1, as can be seen in FIG. 7*c*. Two of the total of four guide elements 4.11 then extend through the two guide slots 6.11, which are arranged parallel to each other, of the drive rod 6.1 into the guides 2.11 of the hinge base 2.1. The bolt portion 4.2 of the bolt 4 points here in the direction of the pivot pin receptacle 2.17. The bolt holder 2.2 is subsequently then mounted and positioned in such a manner that the two mounting pins 7.41 extend through the two bores into the connection protrusion 2.24 of the bolt holder 2.2. The bolt holder 2.2 then embraces the bolt 4 and secures the latter against an unintentional movement. The guide elements 4.11 of the bolt 4 extend here into the guides 2.21 of the bolt holder 2.2, and the bolt 4 can move only linearly in the locking direction R. In order to move the bolt 4, the drive rod 6.1 can then be moved perpendicularly to the locking direction R, as has already been described above. In a final step, the bolt holder 2.2 and therefore also the bolt 4 and the hinge base 2.1 are then fastened to the hinge strip 7 via nuts which can be screwed onto the mounting pins 7.41, as can be seen in FIG. 7*d*. Furthermore, it can also be seen that the drive rod 7 is connected to two hinge locks 1 or to two bolts 4, or that the guide elements 4.11 are guided by two bolts 4 in each case in the two guide slots 6.11 of the guide rod 6.1, the guide slots being arranged in the end regions.

Figure 7E:
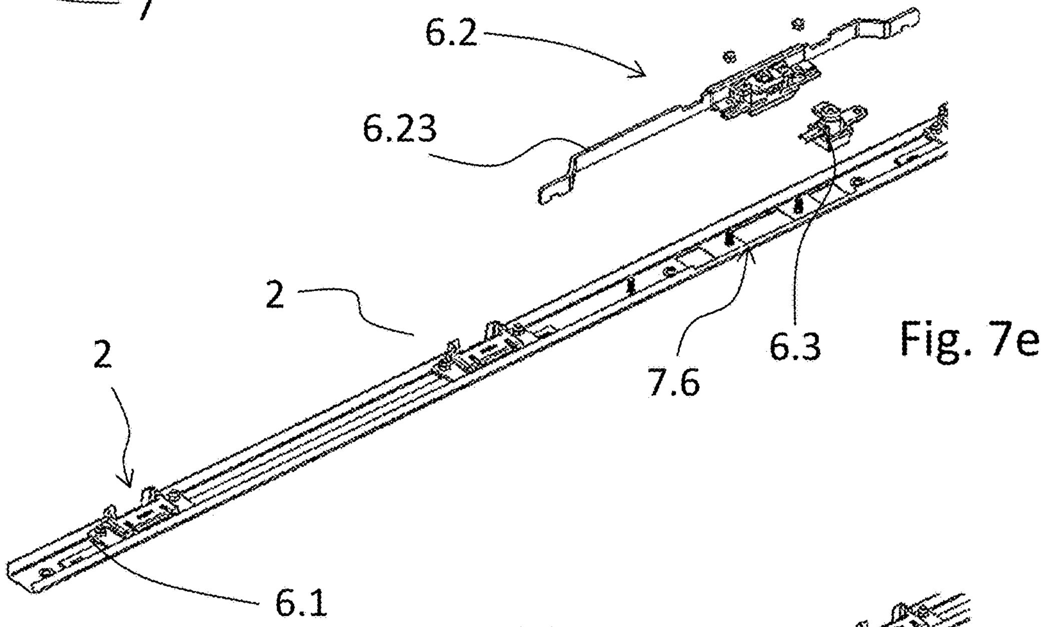
FIG. 7*e* shows a view of another mounting step of the mounting of a hinge assembly which can be mounted on the inner side of a door leaf.

After the first hinge element 2 and the drive rods 6.1 for the movement of the bolts 4 have then been mounted in the hinge strip 7, the drive device 6.2, via which the drive rods 6.1 can be moved, can be mounted. As has already been described above, the drive device 6.2 is configured as a preassembled mounting unit, and therefore the latter can be mounted as a whole in the hinge strip 7. For the drive device 6.2, the hinge strip 7 has a mounting point 7.6 which has suitably oriented mounting pins 7.61 and corresponding recesses such that the actuating element 6.24 can be actuated from the outside. As can be seen in FIG. 7*e*, the mounting point 7.6 has both a recess for the blocking device 6.3 arranged above the drive housing 6.25 and for a blocking device 6.3 arranged below the drive housing 6.25. However, in practice, only one of these two recesses is provided or one of the recesses is closed via a blind cover.

After the mounting of the drive device 6.2, the hook-shaped end-side connection portions of the actuation rod 6.23 engage in the correspondingly configured portions of the drive rod 6.1 such that the actuation rod 6.23 is coupled via its two end regions to two drive rods 6.1. The actuation rod 6.23 which is configured as a flat rod is arranged here parallel to the first limb element 7.2 and therefore also perpendicularly to the drive rod 6.1, which is likewise configured as a flat rod. All four hinge locks 1 can then be jointly and simultaneously actuated via the drive device 6.2. If the hinge strip 7 has been correspondingly fitted with the hinge locks 1 and the drive device 6.2, said hinge assembly 11 can be arranged as a preassembled mounting unit on the inner side of a door leaf 10.1. According to FIG. 3, mounting pins 10.4 can be arranged for this purpose on the inner side of the door leaf, via which mounting pins the hinge strip 7 can then be screwed to the door leaf 10.1.

Figure 3:
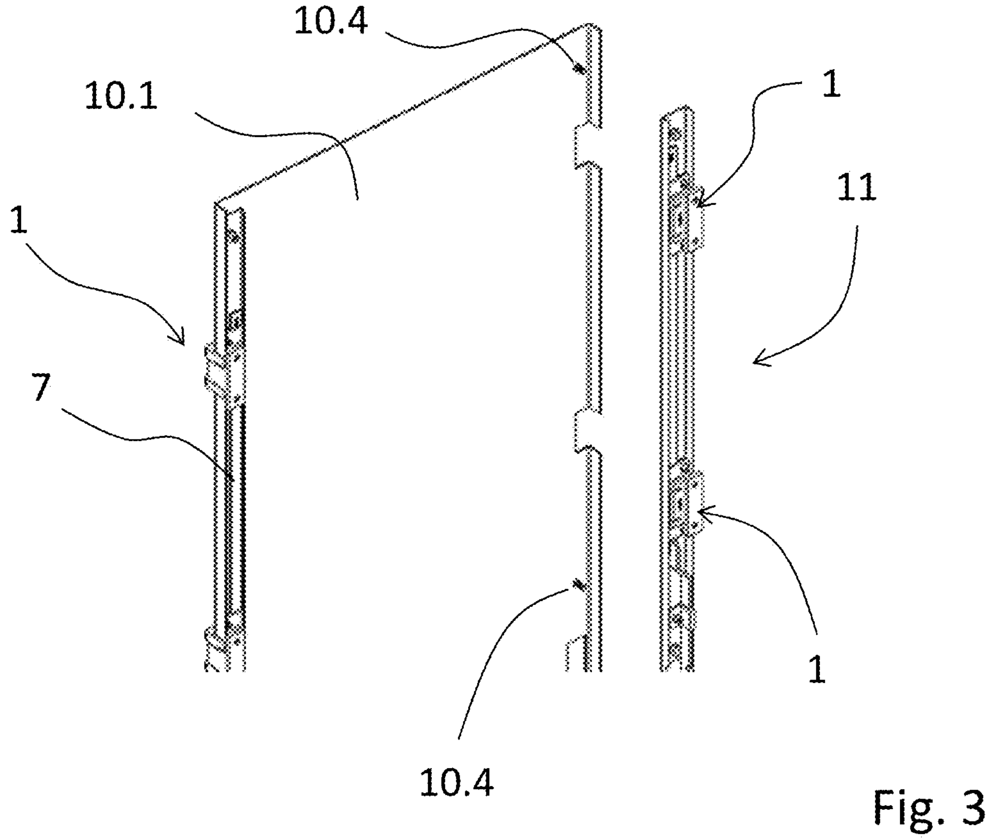
FIG. 3 shows the door according to FIG. 2 in a view of the inner side of the door leaf.

It can be seen in FIG. 3 that the second hinge elements 3 have also already been connected to the first hinge elements 2. For this purpose, the bolts 4 have to be transferred into the release position E, and the second hinge elements 3 can then be pushed into the first hinge elements 2 such that the pivot pins 3.2 of the second hinge elements 3 then lie in the pivot pin receptacles 2.17 of the hinge base 2.1. The bolts 4 are subsequently transferred again into the locking position V in order to secure the pivot pins 3.2 between bolt 4 and pivot pin receptacle 2.7. The door leaf 10.1 can then be fastened to the door frame 10.2 by fastening the second hinge elements 3 to the latter. Alternatively, the two hinge elements 3 can also be arranged first on the door frame 10.2 and the door leaf 10.1 or the corresponding hinge bases 2.1 can be plugged onto the second hinge elements 3.

Figure 7F:
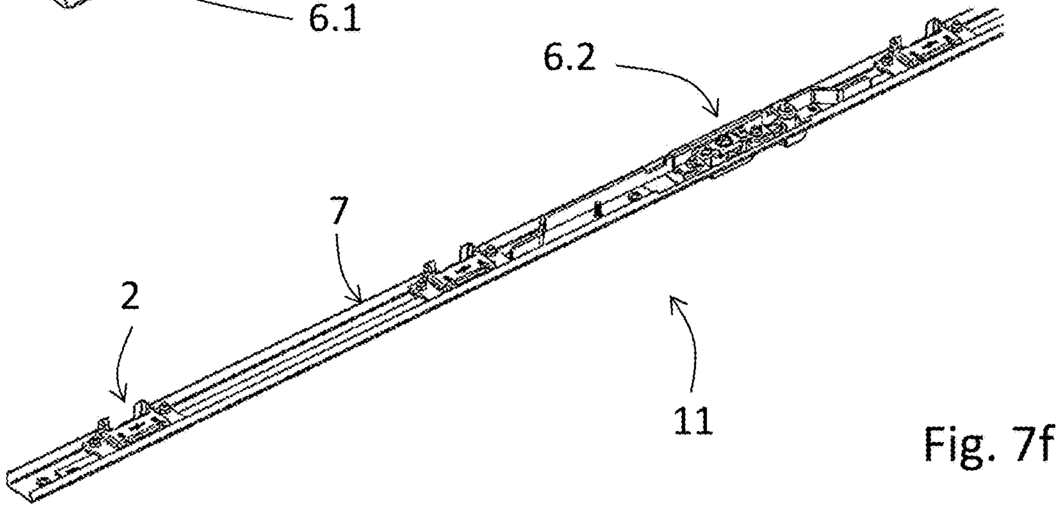
FIG. 7*f* shows a view of another mounting step of the mounting of a hinge assembly which can be mounted on the inner side of a door leaf.
Figure 8A:
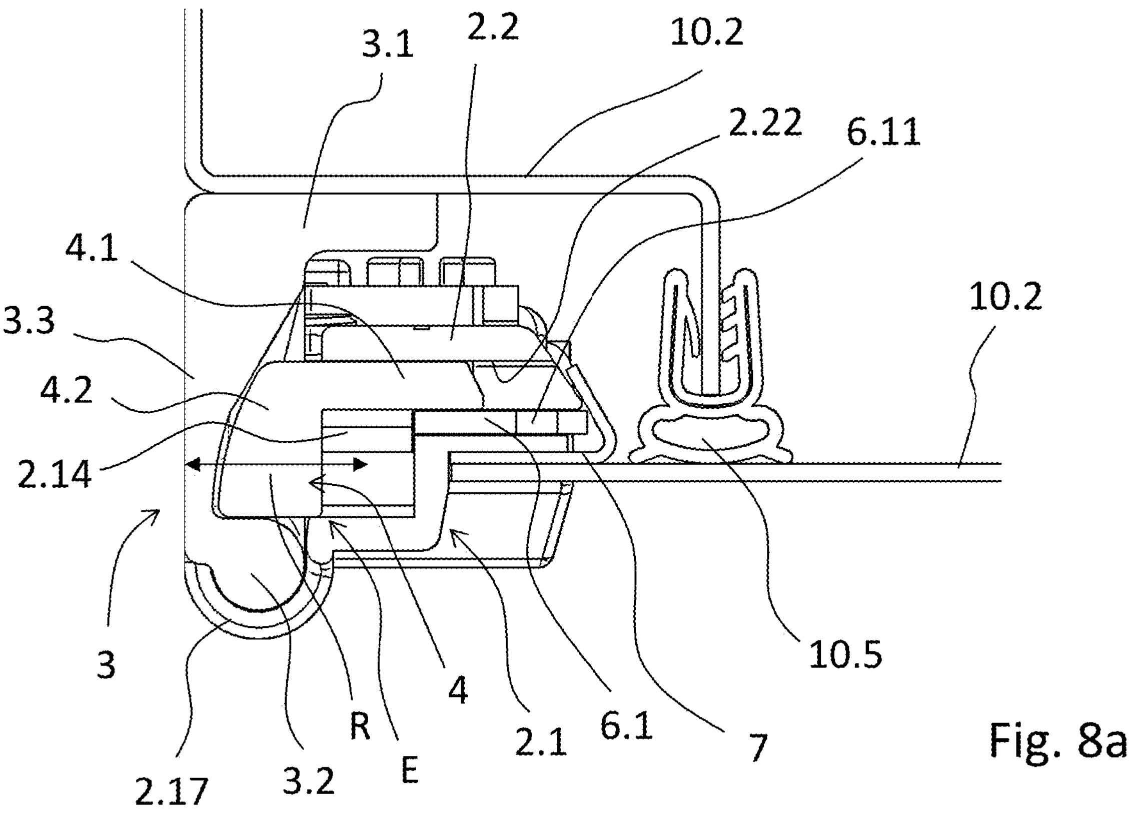
FIG. 8*a* shows a cross section through a door having a hinge assembly, which is arranged on the inner side of the door leaf, in a locking position.
Figure 8B:
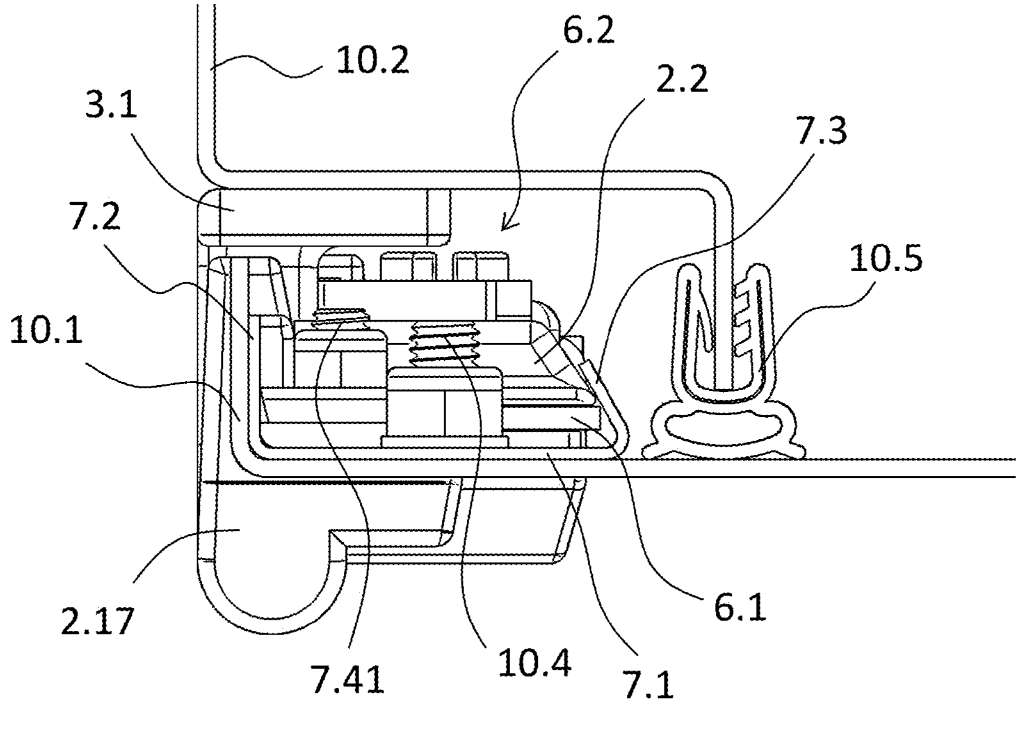
FIG. 8*b* shows another cross section through a door having a hinge assembly, which is arranged on the inner side of the door leaf, in a locking position.

FIGS. 8*a* and 8*b* show an end region of the door leaf 10.1 in a closed position. The door frame 10.2 has a step, at the end of which a seal 10.5 is arranged, the seal being compressed by the door leaf 10.1 in the closed position. Furthermore, the step of the door frame 10.2, which step extends into the free frame cross section, has a mounting region which extends parallel to the surface of the door leaf 10.1 and on which the second hinge element 3 is arranged. The hinge assembly 11 which is illustrated in FIG. 7*f* is arranged on the inner side of the door leaf 10.1 that faces the door frame 10.2. FIG. 8*a* corresponds here to a sectional view through the bolt 4. Accordingly, only part of the basic element 7.1 and the second angled limb element 7.3 of the hinge strip 7 can also be seen. The bolt 4 is in the locking position V, and therefore the bolt secures the pivot pin 3.2 in the pivot pin receptacle 2.17 and only a rotational movement about the pivot axis S is possible instead of any translational movements of the two hinge elements 2, 3. In FIG. 8*a*, the drive rod 6.1 can be seen as a flat element, and the latter is moved in the viewing direction, i.e. perpendicularly to the sheet plane, for moving the bolt 4. The clearance, into which the bolt 4 is moved during a transfer from the locking position V into the release position E, can also be readily seen. The drive device 6.2 or the screw, via which the actuation element 6.24 and the pinion 6.22 are secured in the axial direction on the drive housing 6.25, can be seen in the background.

The entire hinge strip 7, i.e. also the first limb element 7.2, which lies against a chamfer of the door leaf 10.1 pointing in the direction of the door frame 10.2, can be seen in FIG. 8*b*. Since, in the view according to FIG. 8*b*, the hinge element 1 is not itself illustrated in a sectional view, the bolt 4 which is accommodated in the interior of the first hinge element 2 between the hinge base 2.1 and the bolt holder 2.2 cannot be seen. However, both the mounting pin 10.4, via which the hinge assembly 11 or the hinge strip 7 is arranged on the inner side of the door leaf 10.1, and the mounting pin 7.41, via which the hinge base 2.1 and the bolt holder 2.2 are connected to the hinge strip 7, can be seen.

Figure 9:
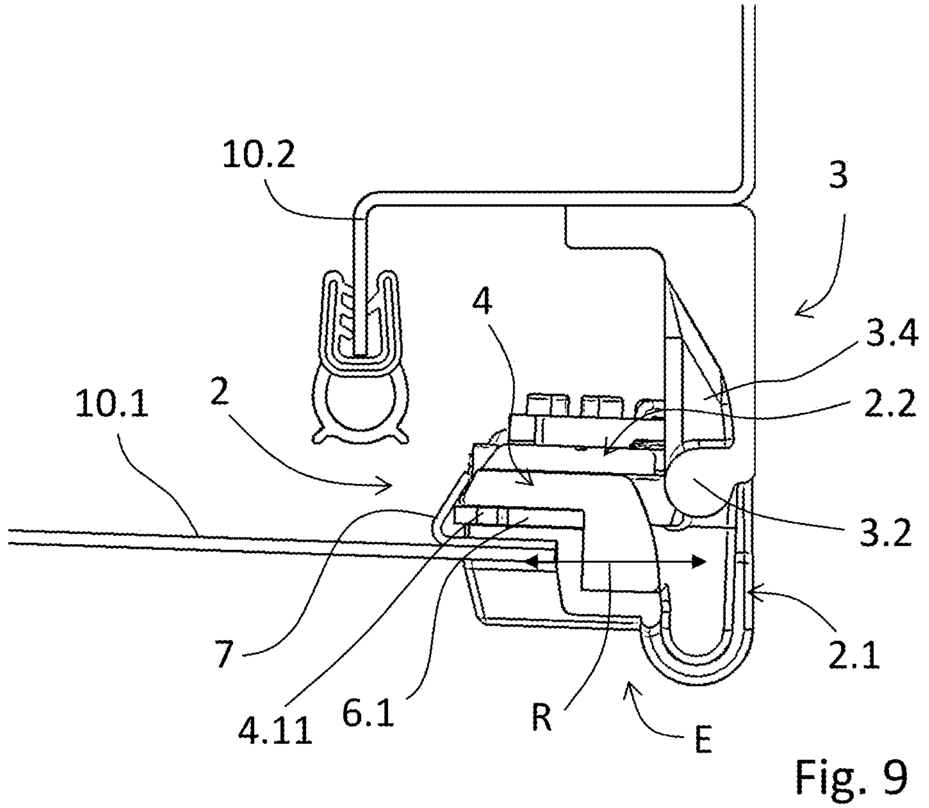
FIG. 9 shows the door according to FIGS. 8*a* and 8*b*, wherein the hinge lock is in a release position.
Figure 10:
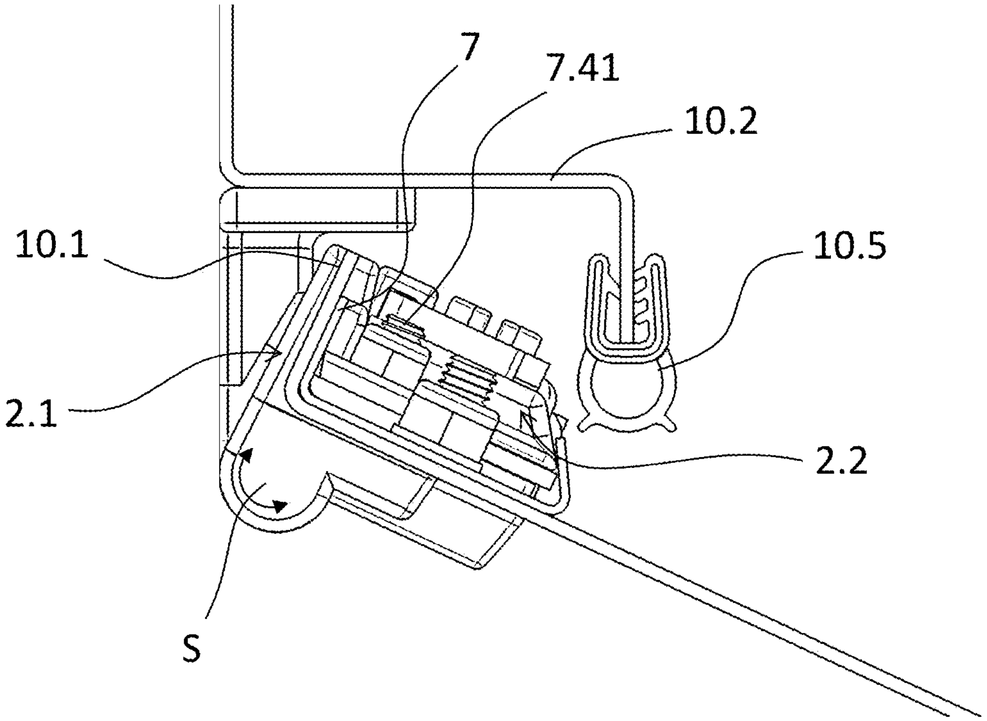
FIG. 10 shows the door according to FIGS. 8*a* and 8*b* in a pivoted position.

The illustration in FIG. 9 basically corresponds to the view from FIG. 8*a*, but the bolt 4 is in the release position E, and therefore the door leaf 10.1 can be moved in a translational manner in relation to the door frame 10.2, and the door leaf 10.1 can be pivoted, for example, about the left pivot axis S, which is illustrated in FIG. 10. The guide elements 4.1 of the bolt 4 are located in the end region of the S-shaped guide slot 6.11 such that, in this position, the bolt 4 also no longer lies in the receiving region 3.4 between the pivot pin 3.2 and the mounting region 3.1 of the second hinge element 3. FIG. 10 then shows the opposite end region of the door leaf 10.1 in a pivoted position. The hinge elements 1 of the hinge assembly 11 arranged in this end region are in the locking position V, and therefore a pivoting movement of the door leaf 10.1 is possible.

The second configuration, which is illustrated in FIGS. 14 to 17, relates to a hinge strip 7 and a hinge assembly 11 arranged on the outer side of the door leaf 10.1 instead of on the inner side of the door leaf 10.1. Since the hinge strips 7 are correspondingly visible from the outside, the latter, in addition to the previously described configuration, also have a hinge strip cover 7.7 and closing elements 7.8 at the upper and at the lower end. The differences of the hinge elements 2, 3 over the first embodiment will be explained in more detail below with reference to FIGS. 19*a* to 21.

FIGS. 18*a* to 18*e* show the mounting of the individual components of the hinge assembly 11 analogously to the illustrations in FIGS. 7*a* to 7*f*. In order to see the two end regions of the hinge strip 7, the central region of the hinge strip 7 is not illustrated in FIGS. 18*d* and 18*e*. Since, however, the drive device 6.2 located in this region is identical to the drive device 6.2 which has already been described above with regard to the hinge assembly 11 that is suitable for the mounting on the inside, reference is made to the above description in respect of the configuration and the connection of the drive device 6.2.

Figure 18A:
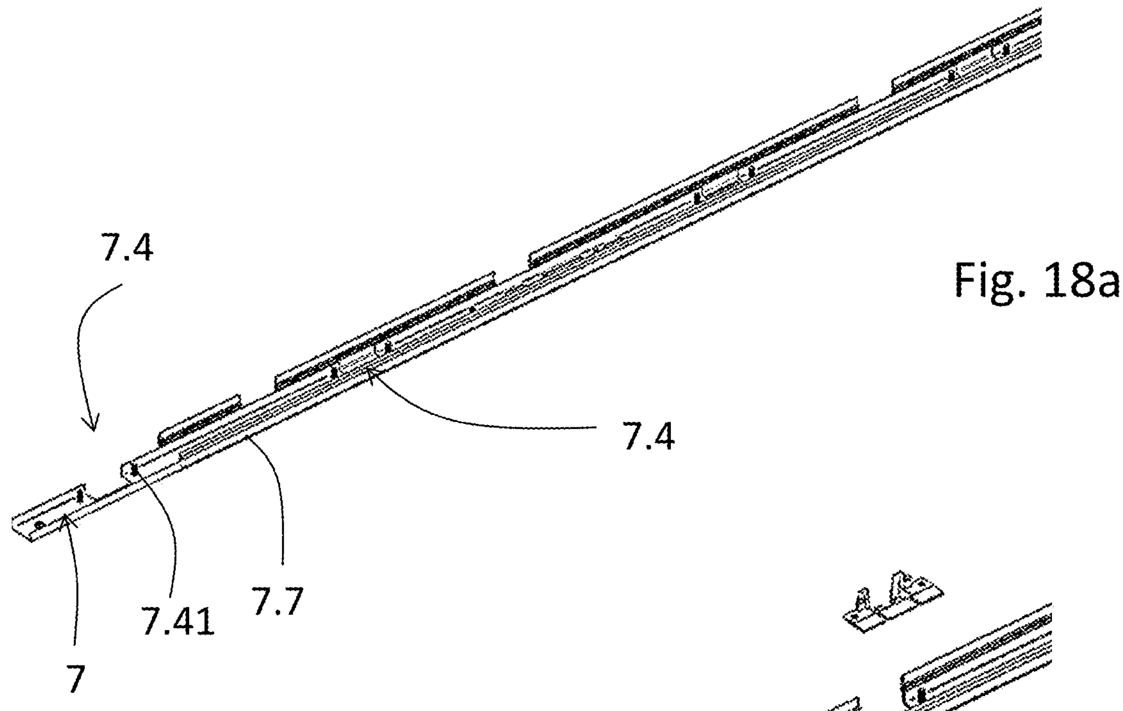
FIG. 18*a* shows a mounting step of the mounting of a hinge assembly which can be mounted on the outer side of a door leaf.
Figure 18B:
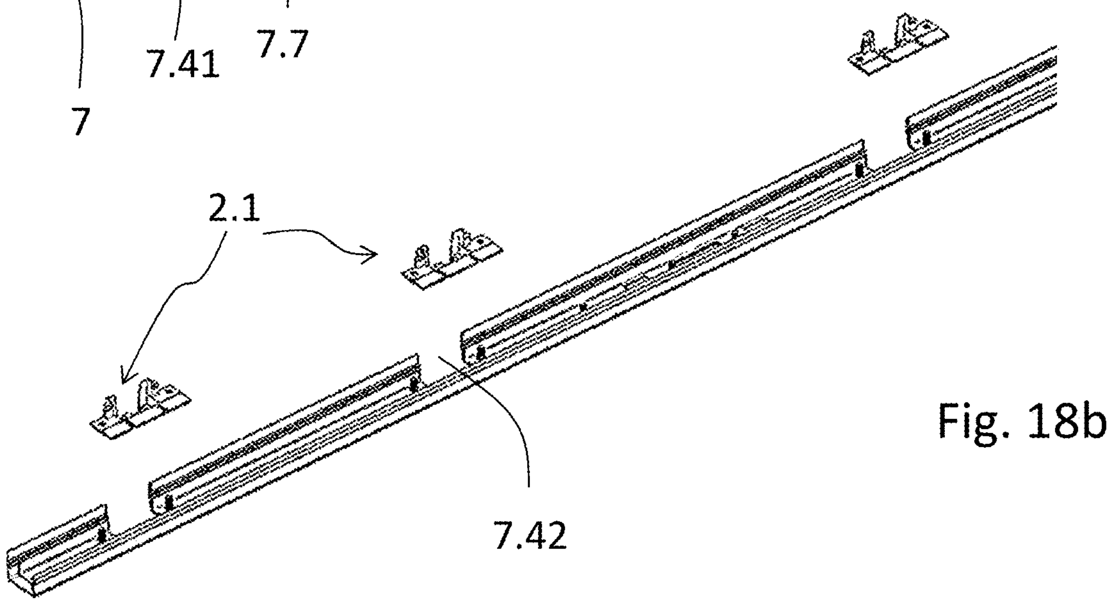
FIG. 18*b* shows another mounting step of the mounting of a hinge assembly which can be mounted on the outer side of a door leaf.
Figure 18C:
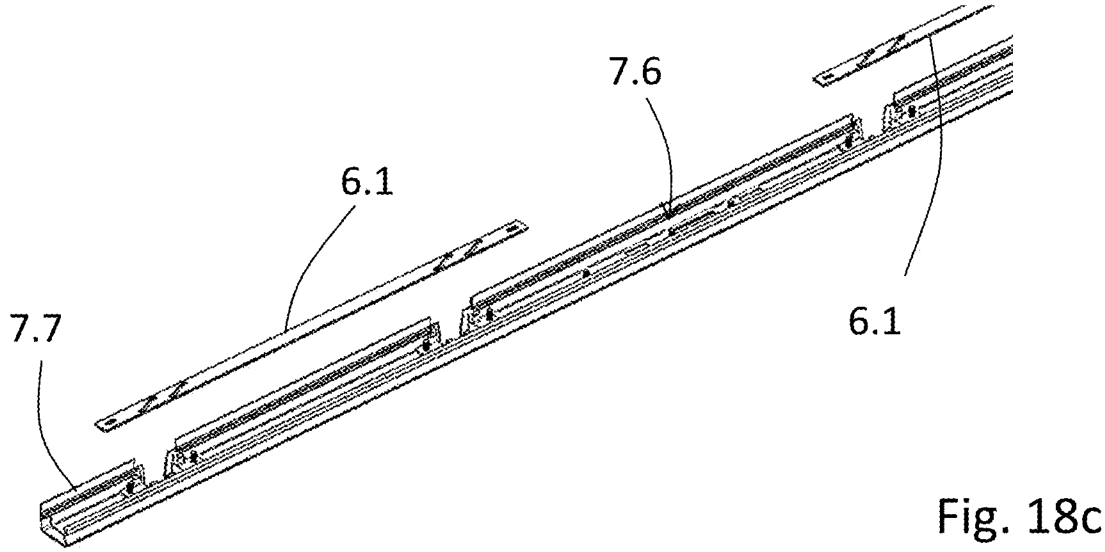
FIG. 18*c* shows another mounting step of the mounting of a hinge assembly which can be mounted on the outer side of a door leaf.

In the case of the hinge assembly 11 for the mounting on the outside, the hinge strip 7 is first of all pushed into the hinge strip cover 7.7, as can be seen in FIG. 18*a*. Since the hinge strip 7 is configured identically both for mounting on the inside and for mounting on the outside, reference is also made to this extent to the above description. The mounting of the hinge base 2.1 and of the drive rod 6.1 illustrated in FIGS. 18*b* and 18*c* is also identical to what has already been described above in respect of FIGS. 7*a* and 7*b*. The mounting of the bolt 4 and of the bolt holder 2.2 is therefore not also illustrated in FIGS. 18*a* to 18*e*.

Figure 18D:
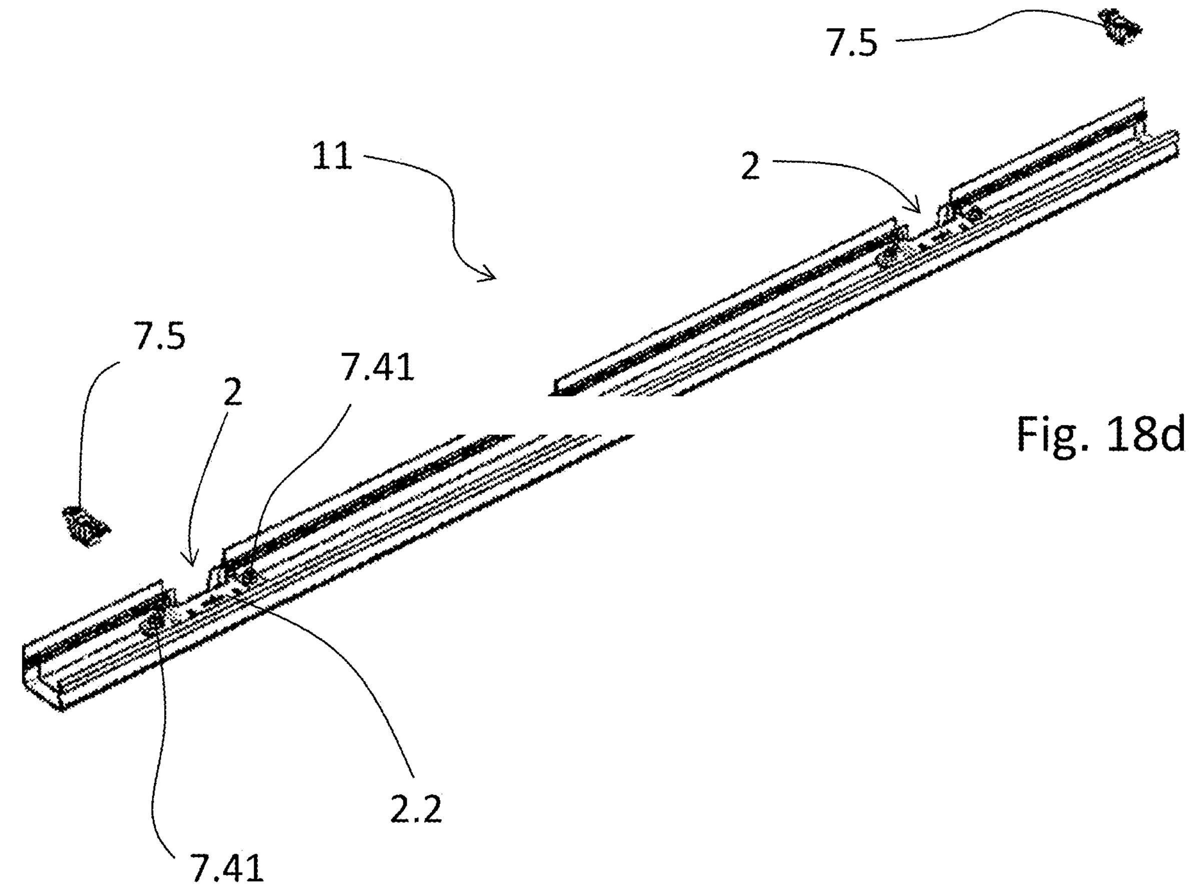
FIG. 18*d* shows another mounting step of the mounting of a hinge assembly which can be mounted on the outer side of a door leaf.
Figure 18E:
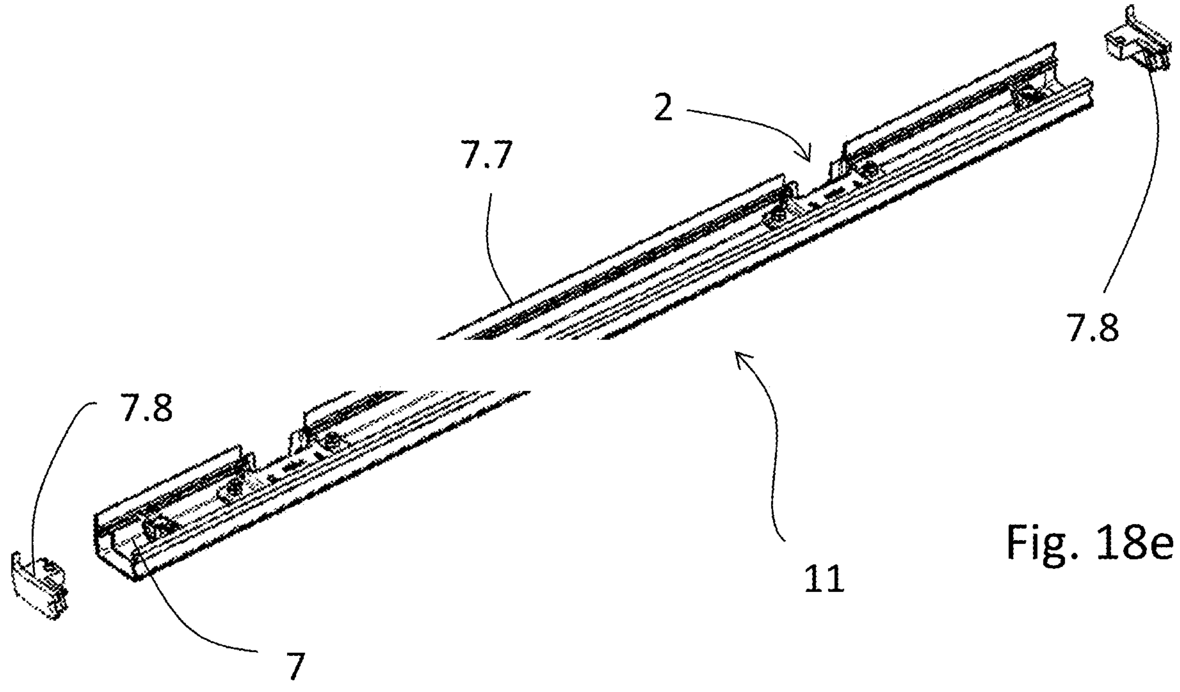
FIG. 18*e* shows another mounting step of the mounting of a hinge assembly which can be mounted on the outer side of a door leaf.

In contrast to the hinge assembly 11 for the mounting on the inside, after the mounting of the first hinge element 2 in the case of the hinge assembly 11 for the mounting on the outside, the hinge strip cover 7.7 is connected to the hinge strip 7. For this purpose, use is made of a mounting element 7.5 which is configured as a pressure piece and which is illustrated in the illustration of FIG. 18*d*. The pressure piece is supported in relation to the hinge strip 7 and has two protrusions which are configured in the manner of wings and which, in the connected position, engage behind or in corresponding notches in the hinge strip cover 7.7. The hinge strip cover 7.7 is therefore clamped against the hinge strip 7 by the pressure piece. For the mounting, the pressure piece is first of all introduced into the hinge strip 7 and then rotated by 900 such that the protrusions engage under the hinge strip cover 7.7 or into the corresponding receptacle. By means of the inherent stress in the material of the pressure piece, the hinge strip cover 7.7 is then connected in a frictionally locking manner to the hinge strip 7 such that, for example, no screws which are visible from the outside have to be screwed into the hinge strip cover 7.7. In a final step, the ends of the hinge strip 7 or of the hinge strip cover 7.7 are then also closed via closing elements 7.8, as can be seen in FIG. 18*e*.

Figure 19A:
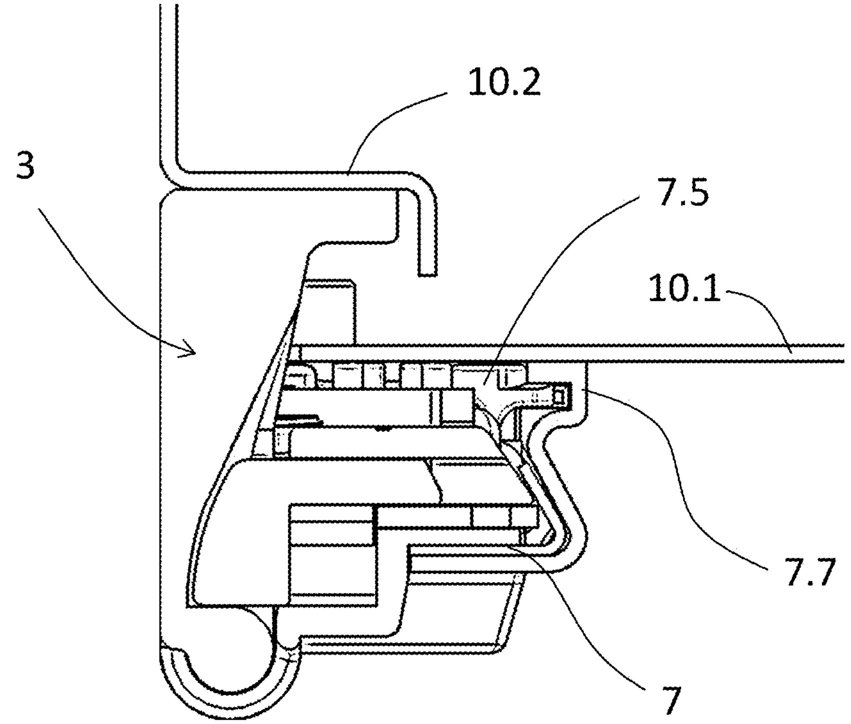
FIG. 19*a* shows a cross section through a door with a hinge assembly, which is arranged on the outer side of the door leaf, in a locking position.
Figure 19B:
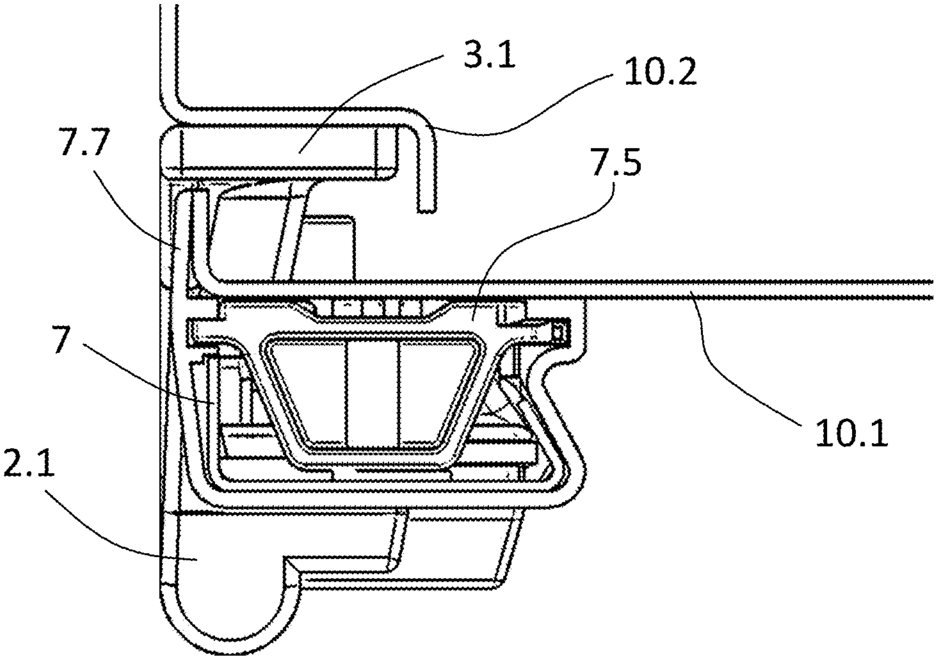
FIG. 19*b* shows a different cross section through a door with a hinge assembly, which is arranged on the outer side of the door leaf, in a locking position.
Figure 20:
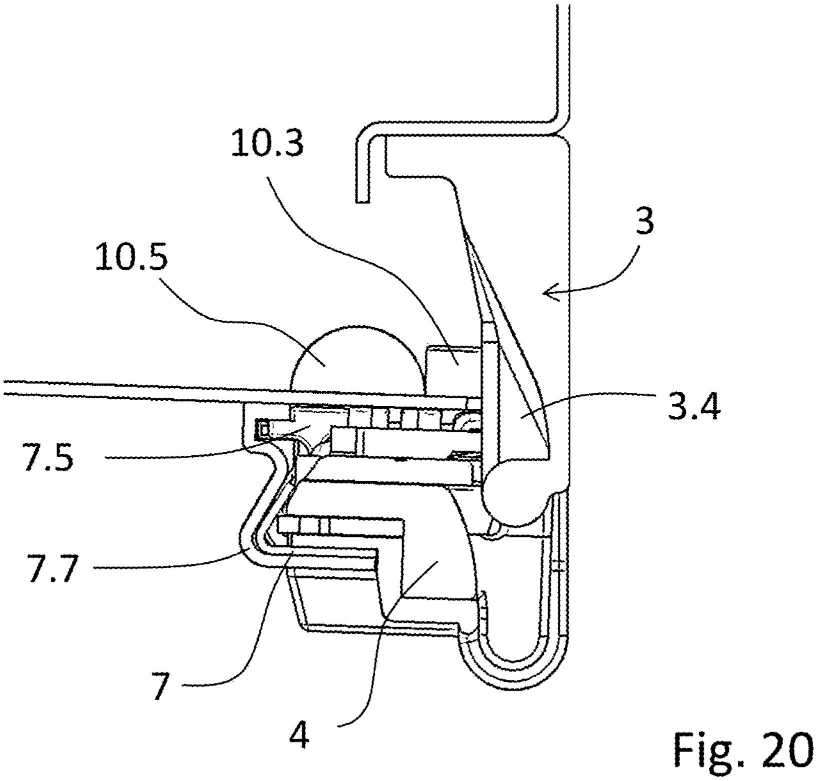
FIG. 20 shows the door according to FIGS. 19*a* and 19*b*, wherein the hinge lock is in a release position.
Figure 21:
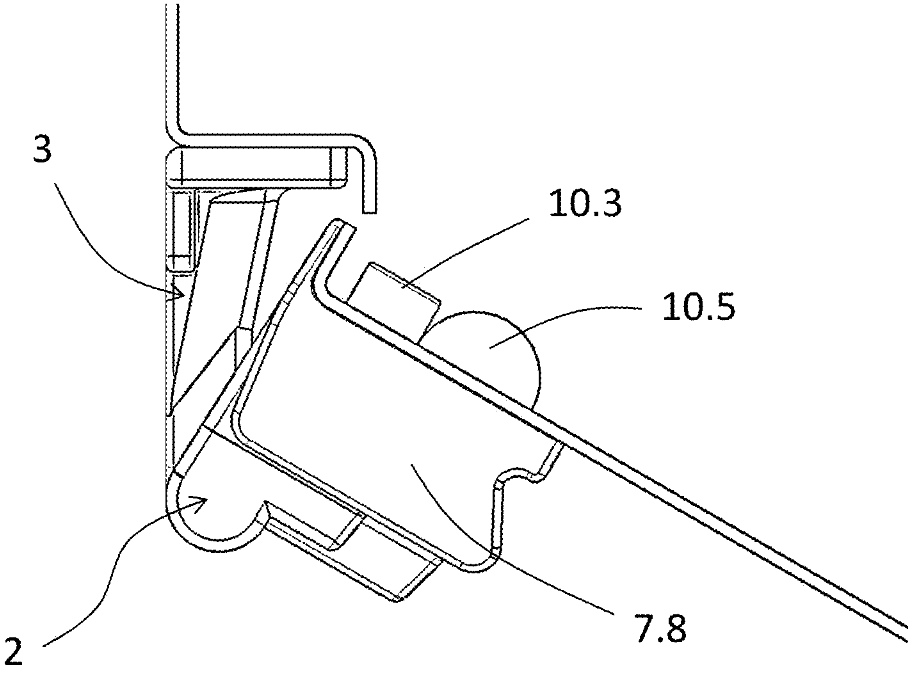
FIG. 21 shows the door according to FIGS. 19*a* and 19*b* in a pivoted position.

FIGS. 19*a* and 19*b*, analogously to FIGS. 8*a* and 8*b*, show the hinge assembly 1 which is arranged on the outer side of the door leaf 10.1. A substantial difference consists in that the first hinge element 3 for the mounting on the outside is longer than for the mounting on the inside. This is associated with the fact that the second hinge element 2 has to span not only the distance between door frame 10.2 and door leaf 10.1, but in addition also the height of the hinge strip 7. A pivot axis S which is further away from the door frame 10.2 then also results therefrom. Equally, during the mounting on the outside, the door leaf 10.1 overall can reach closer to the door frame 10.2 since little space, if any at all, is required there for the hinge assembly 11, as becomes clear when comparing FIGS. 19*a* and 8*a*. In addition, a larger free door frame cross section is also produced since, in the door frame 10.2, only sufficient space is needed for the mounting of the second hinge element 3, but not in addition also for the first hinge element 2 or the hinge strip 7 and the drive actuation means 6.2.

The mounting element 7.5 and the protrusions which grip behind the hinge strip cover 7.7 and which thereby press the hinge strip cover 7.7 against the hinge strip 7 can be seen in FIG. 19*b*. With regard to FIGS. 20 and 21, reference is made to the description of FIGS. 9 and 10.

Figure 16:
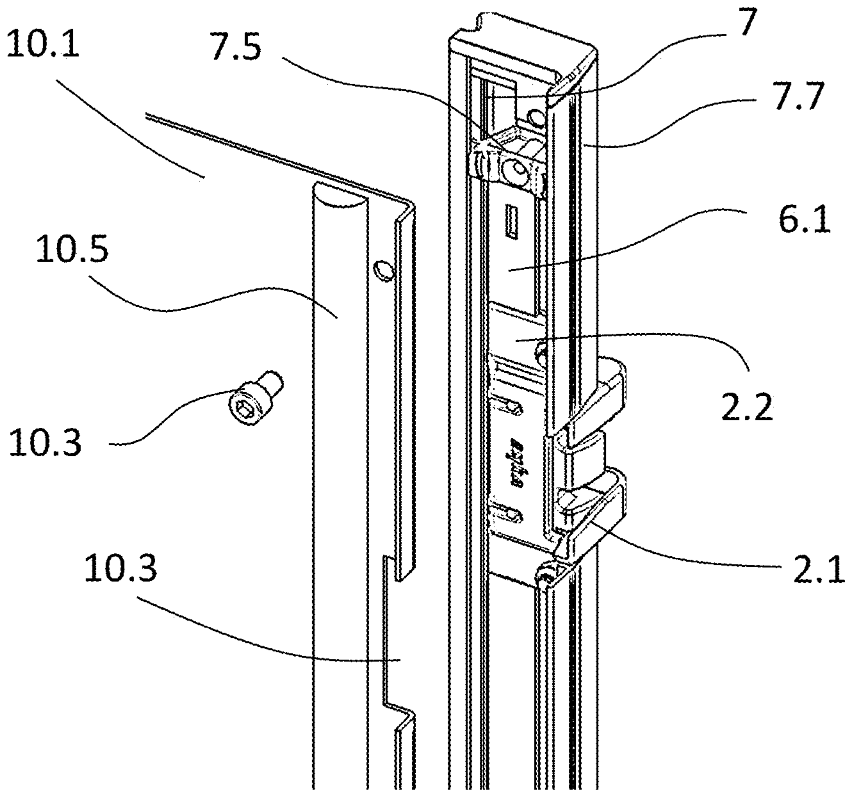
FIG. 16 shows an exploded detailed view of a hinge assembly mounted on the outer side of the door leaf.
Figure 17:
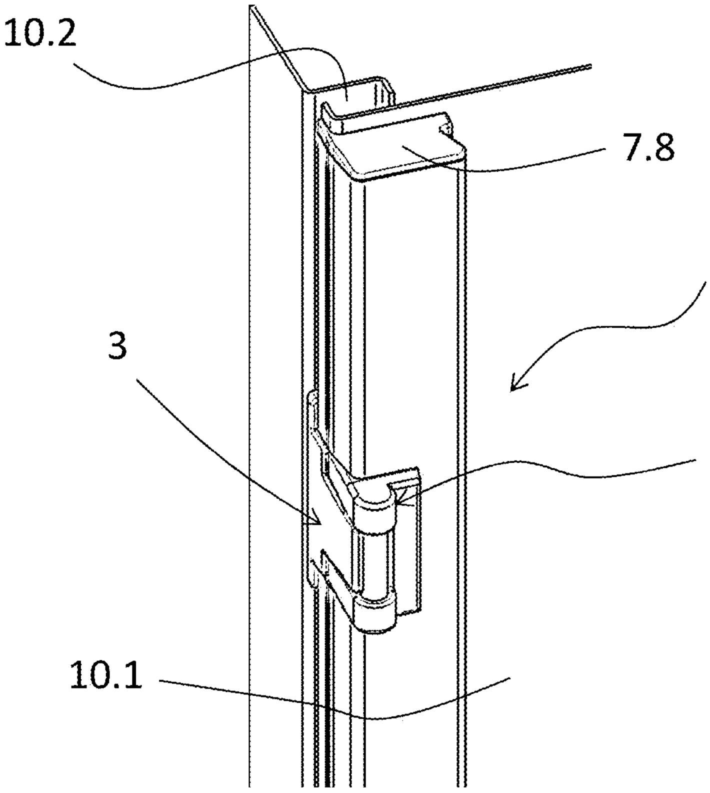
FIG. 17 shows a hinge assembly mounted on the outer side of the door leaf, in a perspective view.

In order to fasten the hinge assembly 11 to the outer side of the door leaf 10.1, mounting pins 10.3 which are configured as hexagon socket screws are provided according to FIG. 16. Said mounting pins are screwed from the inside through the door leaf 10.1 and then into the hinge strip 7 such that no screws can be seen from the outside. Alternatively, it is also possible to screw the screws into the mounting element 7.5.

Overall, the hinge assemblies 11 for the mounting on the inside and for the mounting on the outside differ only slightly from one another, and therefore simple conversion and simple adaptation of the preassembled components is possible.

REFERENCE SIGNS

1 Hinge lock
2 First hinge element
2.1 Hinge base
2.11 Guide
2.14 Guide surface
2.15 Guide protrusion
2.16 Drive rod sliding surface
2.17 Pivot pin receptacle
2.18 Mounting portion
2.19 Mounting bore
2.2 Bolt holder
2.21 Guide
2.22 Bolt sliding surface
2.23 Guide surface
2.24 Connection protrusion
2.25 Drive rod sliding surface
3 Second hinge element
3.1 Mounting region
3.2 Pivot pin
3.3 Connection region
3.31 Reinforcing ribs
3.4 Receiving region
4 Bolt
4.1 Movement portion

4.11 Guide element
4.2 Bolt portion
4.21 Recess
4.22 Bolt block
5 Connection elements
6 Actuation device
6.1 Drive rod
6.11 Guide slot
6.2 Drive device
6.22 Pinion
6.23 Actuation rod
6.24 Actuation element
6.25 Drive housing
6.26 Linear guide
6.3 Blocking device
6.31 Blocking tongue
6.32 Connection region
7 Hinge strip
7.1 Basic element
7.2 First limb element
7.3 Second limb element
7.4 Mounting point
7.41 Mounting pin
7.42 Mounting recess
7.5 Mounting element
7.6 Mounting point
7.61 Mounting pin
7.7 Hinge strip cover
7.8 Closing element
10 Door
10.1 Door leaf
10.2 Door frame
10.3 Mounting recess
10.4 Mounting pin
10.5 Seal
11 Hinge assembly
R Locking direction
S Pivot axis
E Release position
V Locking position Having described the invention in detail and by reference to the various embodiments, it should be understood that modifications and variations thereof are possible without departing from the scope of the claims of the present application.

What is claimed is:

1. A hinge lock for locking a door leaf in relation to a door frame and for pivoting the door leaf in relation to the door frame, having a first hinge element for arranging on the door leaf and a second hinge element for arranging on the door frame, the first hinge element including a hinge base and a bolt holder, wherein the first hinge element and the second hinge element are lockable with respect to each other via a bolt which is movable to and fro in a locking direction between a release position and a locking position, wherein the bolt is movably accommodated between the hinge base and the bolt holder, and the bolt is movable to and fro between the release position and the locking position via a drive rod which is movable transversely with respect to the locking direction, wherein the drive rod is positioned between the hinge base and the bolt holder, and is movable to and fro linearly perpendicularly to the locking direction of the bolt, wherein the hinge lock includes rotatable pinion operatively coupled to the drive rod such that rotation of the pinion causes the linear movement of the drive rod, wherein the second hinge element has a pivot pin defining a pivot axis, wherein the hinge base has a pivot pin receptable for receiving the pivot pin, wherein the bolt includes a pair of guide elements oriented in a direction perpendicular to the transverse movement of the bolt, wherein the first hinge element includes a pair of guides, each guide being configured to slidably receive a respective one of the pair of guide elements therein to guide the transverse movement of the bolt, and wherein the drive rod includes a pair of guide slots, each guide slot being configured to receive a respective one of the pair of guide elements therein such that the linear movement of the drive rod causes the transverse movement of the bolt.

2. The hinge lock as claimed in claim 1, wherein each guide slot has an S-shaped configuration.

3. The hinge lock as claimed in claim 1, wherein the first hinge element is of multi-part configuration.

4. The hinge lock as claimed in claim 1, wherein the bolt is accommodated captively between the hinge base and the bolt holder.

5. The hinge lock as claimed in claim 1, wherein the bolt is guided in the hinge base and/or in the bolt holder.

6. The hinge lock as claimed in claim 1, wherein the drive rod is arranged between the bolt and the hinge base.

7. The hinge lock as claimed in claim 1, wherein the bolt holder laterally embraces the bolt.

8. The hinge lock as claimed in claim 1, wherein the hinge base and the bolt holder are releasably connected to each other.

9. The hinge lock as claimed in claim 1, wherein the second hinge element has a mounting region for mounting on a door frame.

10. The hinge lock as claimed in claim 1, wherein the pivot pin is secured between the hinge base and the bolt.

11. A door having a hinge lock as claimed in claim 1.

12. The hinge lock as claimed in claim 1 wherein the hinge lock includes an actuation rod coupled to the drive rod and configured for movement in a linear direction, and wherein the rotatable pinion is configured to mesh with the actuation rod such that rotation of the pinion causes linear movement of the actuation rod.

13. The hinge lock as claimed in claim 1 wherein the pair of guides of the first hinge element are positioned in the hinge base.

14. The hinge lock as claimed in claim 1 wherein each of the pair of guide elements extends in two opposite directions from the bolt, and wherein the bolt holder includes a pair of guides, each guide of the bolt holder being configured to slidably receive a respective one of the pair of guide elements therein to guide transverse movement of the bolt.

* * * * *